United States Patent
Oh et al.

(10) Patent No.: US 9,591,257 B2
(45) Date of Patent: Mar. 7, 2017

(54) VIDEO DATA PROCESSING METHOD AND DEVICE FOR DISPLAY ADAPTIVE VIDEO PLAYBACK

(71) Applicant: LG ELECTRONICS INC., Seoul (KR)

(72) Inventors: Hyunmook Oh, Seoul (KR); Jongyeul Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/726,844

(22) Filed: Jun. 1, 2015

(65) Prior Publication Data

US 2016/0044277 A1    Feb. 11, 2016

Related U.S. Application Data

(60) Provisional application No. 62/034,792, filed on Aug. 8, 2014.

(51) Int. Cl.
   *H04N 5/44*      (2011.01)
   *H04N 7/01*      (2006.01)
   (Continued)

(52) U.S. Cl.
   CPC .............. *H04N 7/0125* (2013.01); *G06F 3/14* (2013.01); *G09G 5/006* (2013.01); *H04N 5/44* (2013.01);
   (Continued)

(58) Field of Classification Search
   None
   See application file for complete search history.

(56) References Cited

U.S. PATENT DOCUMENTS

2012/0069154 A1*  3/2012  Talstra .............. H04N 13/0048
                                                       348/51
2014/0079113 A1*  3/2014  Newton .................. G09G 5/006
                                                       375/240.01
(Continued)

FOREIGN PATENT DOCUMENTS

EP         2629541 A2      2/2013
JP         2014-017850     1/2014
(Continued)

OTHER PUBLICATIONS

Cea: "A DTV Profile for Uncompressed High Speed Digital Interfaces CEA-861-E",, Mar. 31, 2008 (Mar. 31, 2008), pp. 1-160, XP055062580, Retrieved from the Internet: URL:https://www.ce.org/Standards/Standard-Listings/R4-8 DTV-Interface-Subcommittee/CEA-861-E.aspx [retrieved on May 13, 2013] *p. 29-p. 38 **p. 67-p. 71*.

(Continued)

*Primary Examiner* — Eileen Adams
(74) *Attorney, Agent, or Firm* — Dentons US LLP

(57) ABSTRACT

A video data processing method and/device for display adaptive video playback are disclosed. The video data processing method includes transmitting extended display identification data (EDID) indicating capabilities of a sink device to a source device via an interface, the EDID including electro optical transfer function (EOTF) type information for identifying EOTF supported by the sink device, receiving video data from the source device via the interface, and playing the received video data back.

15 Claims, 18 Drawing Sheets

(51) Int. Cl.
  *G06F 3/14*    (2006.01)
  *G09G 5/00*    (2006.01)
  *H04N 21/4363*   (2011.01)
  *H04N 21/44*    (2011.01)
  *H04N 21/41*    (2011.01)
  *H04N 21/462*   (2011.01)

(52) U.S. Cl.
  CPC ....... *H04N 7/0117* (2013.01); *H04N 21/4122* (2013.01); *H04N 21/43635* (2013.01); *H04N 21/44* (2013.01); *H04N 21/4621* (2013.01)

(56) References Cited

U.S. PATENT DOCUMENTS

| | | | | |
|---|---|---|---|---|
| 2014/0210847 | A1* | 7/2014 | Knibbeler | G09G 5/006 345/589 |
| 2015/0117791 | A1* | 4/2015 | Mertens | H04N 19/176 382/239 |

FOREIGN PATENT DOCUMENTS

| | | |
|---|---|---|
| KR | 10-2012-0018145 A | 2/2012 |
| KR | 10-2014-0021191 A | 2/2014 |
| KR | 2014-0066771 A | 6/2014 |

OTHER PUBLICATIONS

DVB Organzation: "CEA Standard HDR Static Metadata Extensions CEA-861.3" DVB, Digital Video Broadcasting, C/O EBU-17A Ancienne Route—CH-1218 Grand Saconnex, Geneva—Switzerland, Mar. 10, 2012 (Mar. 10, 2015), XP017846002, * the whole document*.

Fogg (Harmonic) C et al: "Indication of SMPTE 2084, 2085 and carriage of 2086 metadata in HEVC", 16. JCT-VC Meeting; Sep. 1, 2014-Jan. 17, 2014; San Jose; (Joint Collaborative Team on Video Coding of ISO/IEC JTC1/SC29/WG11 and ITU-T SG.16); URL: http:// wftp3.itu.int/av-arch/jctvc-site/,, No. JCTVC-P0084-v2, Jan. 14, 2014 (Jan. 14, 2014), XP030115562, * abstract* *p. 1-p. 4*.

"High Dynamic Range Electro-Optical Transfer Function of Mastering Reference Displays SMPTE ST 2084:2014",, Aug. 16, 2014 (Aug. 16, 2014), XP055225088, Retrieved from the Internet: URL:http://ieeexplore.ieee.org/stamp.stamp.isp?tp=&arnumber=7291452 [retrieved on Nov. 2, 2015] *p. 4-p. 7*.

International Search Report, English Translation, PCT/KR2015/004400, Apr. 30, 2015.

ISA237; English Translation, PCT/KR2015/004400, Apr. 30, 2015.

Written Opinion of International Searching Authority; PCT/KR2015/004400; Jul. 20, 2015.

International Search Report; PCT/KR2015/004400; Jul. 20, 2015.

* cited by examiner

FIG. 4

| Offset | Value | | | | | | | | Description/Format |
|---|---|---|---|---|---|---|---|---|---|
| 0x00 | 0x14 | | | | | | | | HDR Data Block |
| 0x01 | 7 | 6 | 5 | 4 | 3 | 2 | 1 | 0 | BLOCK Revision and Other Data |
|  | _ | _ | _ | _ | _ | 0 | 0 | 0 | REVISION 0 |
|  | 0 | 0 | 0 | 0 | 0 | _ | _ | _ | RESERVED(BLOCK SPECIFIC) |
| 0x02 | | | | | | | | | Number Of Payload Bytes |
| 0x03 | Descriptor | | | | | | | | Control option flag |
| 0x04 0x05 | Descriptor | | | | | | | | Sink Device Dynamic Range |

FIG. 5

| Offset | Value | | | | | | | | Description/Format |
|---|---|---|---|---|---|---|---|---|---|
| 0x03 | 7 | 6 | 5 | 4 | 3 | 2 | 1 | 0 | Control Option Flag |
|  | 1 | _ | _ | _ | _ | _ | _ | _ | Activate HDR processing in source device |
|  | _ | 1 | _ | _ | _ | _ | _ | _ | Activate WCG processing in source device |
|  | _ | _ | reserved | | | | | | Reserved |

FIG. 6

| Control option flag | description | Detailed description |
|---|---|---|
| 00000000 | No change | Source device does not perform any processing |
| 10000000 | Source device (HDR) | Source device performs only HDR |
| 01000000 | Source device (WCG) | Source device performs only WCG |
| 11000000 | Source device | Source device performs all processing based on delivered information (initial value) |

FIG. 7

| Offset | Value | | | | | | | | Description/Format |
|---|---|---|---|---|---|---|---|---|---|
| | 7 | 6 | 5 | 4 | 3 | 2 | 1 | 0 | Sink Device Dynamic Range |
| 0x04 | 0x00 -> 0xFF | | | | | | | | Lowest Brightness level of Sink device (higher 8 bits) |
| 0x05 | 1 | _ | _ | _ | _ | _ | _ | | Lowest Brightness level of Sink device (LSB) |
| | _ | 0x00 -> 0x3F | | | | | | | Highest Brightness level of Sink device (total 7 bits) |

FIG. 8

| Offset | Value | Description/Format | |
|---|---|---|---|
| 00h | 00h | DISPLAY PARAMETERS DATA BLOCK | TAG |
| 01h | 7 6 5 4 3 2 1 0 | Block Revision and Other Data | |
| | _ _ _ _ _ 0 0 0 | REVISION '0' | VALUES 0 — 7 |
| | 0 0 0 0 0 _ _ _ | RESERVED | |
| 02h | 0Ch | Number of Payload Bytes in BLOCK | 12 |
| 03h 04h | DESCRIPTOR | Horizontal image size | |
| 05h 06h | DESCRIPTOR | Vertical image size | |
| 07h 08h | DESCRIPTOR | Horizontal pixel count | |
| 09h 0Ah | DESCRIPTOR | Vertical pixel count | |
| 0Bh | DESCRIPTOR | Feature Support Flags | |
| 0Ch | DESCRIPTOR | Transfer Characteristic Gamma | |
| 0Dh | DESCRIPTOR | Aspect Ratio | |
| 0Eh | DESCRIPTOR | Color Bit Depth | |

| Offset | Value | Description/Format |
|---|---|---|
| 0x0F | 7 6 5 4 3 2 1 0 | Control Option Flag |
| | 1 _ _ _ _ _ _ _ | Activate HDR processing in source device |
| | _ 1 _ _ _ _ _ _ | Activate WCG processing in source device |
| | _ _ reserved _ _ | Reserved |
| | 7 6 5 4 3 2 1 0 | Sink Device Dynamic Range |
| 0x10 | 0x00 -> 0xFF | Lowest Brightness level of Sink device (higher 8 bits) |
| 0x11 | 1 _ _ _ _ _ _ _ | Lowest Brightness level of Sink device (LSB) |
| | _ 0x00 -> 0x3F | Highest Brightness level of Sink device (total 7 bits) |

FIG. 9

| Offset | Value | Description/Format | |
|---|---|---|---|
| 00h | 0Ch | DISPLAY DEVICE DATA BLOCK | TAG |
| 01h | 7 6 5 4 3 2 1 0 | BLOCK Revision and Other Data | |
| | _ _ _ _ _ 0 0 0 | REVISION '0' | VALUES 0 — 7 |
| | 0 0 0 0 0 _ _ _ | RESERVED | |
| 02h | 0Dh | Number of Payload Bytes in BLOCK | 13 |
| 03h | DESCRIPTOR | Display Device Technology | |
| 04h | DESCRIPTOR | Device operating mode | |
| 05h — 08h | DESCRIPTOR | Devoce native pixel format | |
| 09h — 0Ah | DESCRIPTOR | Aspect ratio and orientation | |
| 0Bh | DESCRIPTOR | Sub-pixel layout / configuration / shape | |
| 0Ch — 0Dh | DESCRIPTOR | Horizontal and vertical dot / pixel pitch | |
| 0Eh | DESCRIPTOR | Color bit depth | |
| 0Fh | DESCRIPTOR | Response time | |

| Offset | Value | Description/Format |
|---|---|---|
| 0x0F | 7 6 5 4 3 2 1 0 | Control Option Flag |
| | 1 _ _ _ _ _ _ _ | Activate HDR processing in source device |
| | _ 1 _ _ _ _ _ _ | Activate WCG processing in source device |
| | reserved | Reserved |
| | 7 6 5 4 3 2 1 0 | Sink Device Dynamic Range |
| 0x10 | 0x00 -> 0xFF | Lowest Brightness level of Sink device (higher 8 bits) |
| 0x11 | 1 _ _ _ _ _ _ _ | Lowest Brightness level of Sink device (LSB) |
| | _ 0x00 -> 0x3F | Highest Brightness level of Sink device (total 7 bits) |

FIG. 10

|  | Byte# | Bits 5-7 | Bits 0-4 |
|---|---|---|---|
| Video Data Block | 1 | Video Tag Code | length = total number of video bytes following this byte ($L_1$) |
|  | 2 | CEA Short Video Descriptor 1 | |
|  | 3 | CEA Short Video Descriptor 2 | |
|  | ... | ... | |
|  | $1+L_1$ | CEA Short Video Descriptor $L_1$ | |
| Audio Data Block | $2+L_1$ | Audio Tag Code | length = total number of audio bytes following this byte ($L_2$) |
|  | $3+L_1$ | CEA Short Audio Descriptor 1 | |
|  | $4+L_1$ | | |
|  | $5+L_1$ | | |
|  | ... | | |
|  | $L_1+L_2$ | CEA Short Audio Descriptor $L_2/3$ | |
|  | $1+L_1+L_2$ | | |
|  | $2+L_1+L_2$ | | |
| Speaker Allocation Data Block | $3+L_1+L_2$ | Speaker Allocation Tag Code | length = total number of Speaker Allocation bytes following this byte ($L_3 = 3$) |
|  | $4+L_1+L_2$ | Speaker Allocation Data Block Payload (3 bytes) | |
|  | $5+L_1+L_2$ | | |
|  | $6+L_1+L_2$ | | |
| Vendor-Specific Data Block | $7+L_1+L_2$ | Vendor-Specific Tag Code | length = total number of Vendor-Specific bytes following this byte ($L_4$) |
|  | $8+L_1+L_2$ | IEEE OUI third two hex digits | |
|  | $9+L_1+L_2$ | IEEE OUI second two hex digits | |
|  | $10+L_1+L_2$ | IEEE OUI first two hex digits | |
|  | ... | Vendor-Specific Data Block Payload ($L_4$-3 bytes) | |
|  | ... | | |
| Video Capability Data Block | $8+L_1+L_2+L_4$ | Extended Tag Code | length = total number of bytes in this block following this byte ($L_5$) |
|  | $9+L_1+L_2+L_4$ | Video Capabilities Ext. Tag Code = 00h | |
|  | $10+L_1+L_2+L_4$ | Video Capabilities Data Bye 3 (see Section 7.5.6) | |
| Dynamic Range | $11+L_1+L_2+L_4+L_5$ | Dynamic range Tag Code | length = total number of bytes in this block following this byte ($L_6 = 3$) |
|  | $12+L_1+L_2+L_4+L_5$ | Lowest Brightness level of Sink device (higher 8 bits) | |
|  | $13+L_1+L_2+L_4+L_5$ | Lowest Brightness level of Sink device (LSB) | |
|  | $14+L_1+L_2+L_4+L_5$ | Highest Brightness level of Sink device (total 7 bits) | |

FIG. 11

| InfoFrame Type Code | InfoFrame Type = 0x07 (UHDInfoFrame) | | | | | | | |
|---|---|---|---|---|---|---|---|---|
| InfoFrame Version Number | Version = 0x00 | | | | | | | |
| Length of HDRInfoFrame | Length of HDRInfoFrame () | | | | | | | |
| Data Byte 1 | P3 | P2 | P1 | P0 | R2 | R1 | R0 | E0 |
| Data Byte 2 | black_luminance_level (highest 8 bits) | | | | | | | |
| Data Byte 3 | black_lu minance_level (lower 1 bit) | white_luminance_level (7 bits) | | | | | | |
| Data Byte 4 | Orig_black_luminance_level (highest 8 bits) | | | | | | | |
| Data Byte 5 | Orig_bla ck_lumi nance_l evel (lower 1 bit) | Orig_white_luminance_level (7 bits) | | | | | | |
| Data Byte 6 | Orig_color_gamut | | | S3 | S2 | S1 | S0 | |
| Data Byte 7 | Red-x low bits | | Red-y low bits | | Green-x low bits | | Green-y low bits | |
| Data Byte 8 | Blue-x low bits | | Blue-x low bits | | White-x low bits | | White-y low bits | |
| Data Byte 9 | Red-x high bits | | | | | | | |
| Data Byte 10 | Red-y high bits | | | | | | | |
| Data Byte 11 | Green-x high bits | | | | | | | |
| Data Byte 12 | Green-y high bits | | | | | | | |
| Data Byte 13 | Blue-x high bits | | | | | | | |
| Data Byte 14 | Blue-y high bits | | | | | | | |
| Data Byte 15 | White-x high bits | | | | | | | |
| Data Byte 16 | White-y high bits | | | | | | | |
| Data Byte 17 | E3 | E2 | E1 | E0 | Number of Coefficients | | | |
| Data Byte 18 | EOTF_additional_info | | | | | | | |
| Data Byte (18+1) | EOTF_Coefficient 1 | | | | | | | |
| Data Byte (18+2) | EOTF_Coefficient 2 | | | | | | | |
| ... | ... | | | | | | | |
| Data Byte (18+N) | EOTF_Coefficient N | | | | | | | |

FIG. 12

| post_processing_type | description | Detailed description |
|---|---|---|
| 0000 | No change | Source device does not perform any processing |
| 0001 | Dynamic Range mapping | Dynamic range mapping is performed |
| 0010 | Gamut mapping | Gamut mapping is performed |
| 0011 | Source device | Source device performs all processing based on information delivered by sink device |
| 0011-1000 | reserved | These may be used for information exchange between sink and source devices in the future, for frc and multilayer video enhancement function |
| 1001-1111 | User private | |
| 1111 | Different contents gamut | Original color gamut is used to distinguishably signal contents color gamut and container color gamut |

FIG. 13

| Orig_color_gamut | description |
|---|---|
| 0000 | REC. 709 |
| 0001 | BT. 2020 NCL |
| 0010 | xvYCC |
| 0011 | DCI-P3 |
| 0100 | Adobe RGB |
| 0101 | BT. 2020 CL |
| 0110 ~ 1111 | reserved |

FIG. 14

| | | | | | | | | |
|---|---|---|---|---|---|---|---|---|
| InfoFrame Type Code | colspan="8" | InfoFrame Type = 0×02 |
| InfoFrame Version Number | colspan="8" | Version = 0×02 or [0×03] |
| Length of AVI InfoFrame | colspan="8" | Length of AVI InfoFrame (16) |
| Data Byte 1 | [Y2] | Y1 | Y0 | A0 | B1 | B0 | S1 | S0 |
| Data Byte 2 | C1 | C0 | M1 | M0 | R3 | R2 | R1 | R0 |
| Data Byte 3 | ITC | EC2 | EC1 | EC0 | Q1 | Q0 | SC1 | SC0 |
| Data Byte 4 | [VIC7] | VIC6 | VIC5 | VIC4 | VIC3 | VIC2 | VIC1 | VIC0 |
| Data Byte 5 | VQ1 | VQ2 | CN1 | CN0 | PR3 | PR2 | PR1 | PR0 |
| Data Byte 6 | colspan="8" | ETB07-ETB00 (Line Number of End of Top Bar - lower 8 bits) |
| Data Byte 7 | colspan="8" | ETB15-ETB08 (Line Number of End of Top Bar - upper 8 bits) |
| Data Byte 8 | colspan="8" | SBB07-SBB00 (Line Number of Start of Bottom Bar - lower 8 bits) |
| Data Byte 9 | colspan="8" | SBB15-SBB08 (Line Number of Start of Bottom Bar - upper 8 bits) |
| Data Byte 10 | colspan="8" | ELB07-ELB00 (Pixel Number of End of Left Bar - lower 8 bits) |
| Data Byte 11 | colspan="8" | ELB15-ELB08 (Pixel Number of End of Left Bar - upper 8 bits) |
| Data Byte 12 | colspan="8" | SRB07-SBB00 (Pixel Number of Start of Right Bar - lower 8 bits) |
| Data Byte 13 | colspan="8" | SRB15-SBB08 (Pixel Number of Start of Right Bar - upper 8 bits) |
| Data Byte 14 | P3 | P2 | P1 | P0 | R2 | R1 | R0 | E0 |
| Data Byte 15 | colspan="8" | black_luminance_level (highest 8 bits) |
| Data Byte 16 | black_luminance_level(lower 1 bit) | colspan="7" | white_luminance_level (7 bits) |
| Data Byte 17 | colspan="8" | Orig_black_luminance_level (highest 8 bits) |
| Data Byte 18 | Orig_black_luminance_level(lower1 bit) | colspan="7" | Orig_white_luminance_level (7 bits) |
| Data Byte 19 | colspan="4" | Orig_color_gamut | S3 | S2 | S1 | S0 |
| Data Byte 20 | colspan="2" | Red-x low bits | colspan="2" | Red-y low bits | colspan="2" | Green-x low bits | colspan="2" | Green-y low bits |
| Data Byte 21 | colspan="2" | Blue-x low bits | colspan="2" | Blue-y low bits | colspan="2" | White-x low bits | colspan="2" | White-y low bits |
| Data Byte 22 | colspan="8" | Red-x high bits |
| Data Byte 23 | colspan="8" | Red-y high bits |
| Data Byte 24 | colspan="8" | Green-x high bits |
| Data Byte 25 | colspan="8" | Green-y high bits |
| Data Byte 26 | colspan="8" | Blue-x high bits |
| Data Byte 27 | colspan="8" | Blue-y high bits |
| Data Byte 28 | colspan="8" | White-x high bits |
| Data Byte 29 | colspan="8" | White-y high bits |
| Data Byte 30 | E3 | E2 | E1 | E0 | colspan="4" | Number of Coefficients |
| Data Byte 31 | colspan="8" | EOTF_additional_info |
| Data Byte (31+1) | colspan="8" | EOTF_Coefficient 1 |
| Data Byte (31+2) | colspan="8" | EOTF_Coefficient 2 |
| ... | colspan="8" | ... |
| Data Byte (31+N) | colspan="8" | EOTF_Coefficient N |

FIG. 16

| EOTF type | description |
|---|---|
| 000 | Reserved |
| 001 | EOTF_type1 |
| 010 | EOTF_type2 |
| 011-111 | User Private |

FIG. 18

| InfoFrame Type Code | InfoFrame Type = 0×02 | | | | | | |
|---|---|---|---|---|---|---|---|
| InfoFrame Version Number | Version = 0×02 or [0×03] | | | | | | |
| Length of AVI InfoFrame | Length of AVI InfoFrame (13) | | | | | | |
| Data Byte 1 | [Y2] | Y1 | Y0 | A0 | B1 | B0 | S1 | S0 |
| Data Byte 2 | C1 | C0 | M1 | M0 | R3 | R2 | R1 | R0 |
| Data Byte 3 | ITC | EC2 | EC1 | EC0 | Q1 | Q0 | SC1 | SC0 |
| Data Byte 4 | [VIC7] | VIC6 | VIC5 | VIC4 | VIC3 | VIC2 | VIC1 | VIC0 |
| Data Byte 5 | VQ1 | VQ2 | CN1 | CN0 | PR3 | PR2 | PR1 | PR0 |
| Data Byte 6 | ETB07-ETB00 (Line Number of End of Top Bar - lower 8 bits) | | | | | | |
| Data Byte 7 | ETB15-ETB08 (Line Number of End of Top Bar - upper 8 bits) | | | | | | |
| Data Byte 8 | SBB07-SBB00 (Line Number of Start of Bottom Bar - lower 8 bits) | | | | | | |
| Data Byte 9 | SBB15-SBB08 (Line Number of Start of Bottom Bar - upper 8 bits) | | | | | | |
| Data Byte 10 | ELB07-ELB00 (Pixel Number of End of Left Bar - lower 8 bits) | | | | | | |
| Data Byte 11 | ELB15-ELB08 (Pixel Number of End of Left Bar - upper 8 bits) | | | | | | |
| Data Byte 12 | SRB07-SBB00 (Pixel Number of Start of Right Bar - lower 8 bits) | | | | | | |
| Data Byte 13 | SRB15-SBB08 (Pixel Number of Start of Right Bar - upper 8 bits) | | | | | | |

18010

| C1 | C0 | Colorimetry |
|---|---|---|
| 0 | 0 | No Data |
| 0 | 1 | SMPTE 179M [1] |
| 1 | 0 | ITU-R BT_709[7] |
| 1 | 1 | SMPTE 179M Extended Colorimetry Information Valid (colorimetry indicated in bits EC0, EC1, and EC2. See Table 12) |

18020

| EC2 | EC1 | EC0 | Extended Colorimetry |
|---|---|---|---|
| 0 | 0 | 0 | xvYCC$_{601}$ |
| 0 | 0 | 1 | xvYCC$_{709}$ |
| 0 | 1 | 0 | sYCC$_{601}$ |
| 0 | 1 | 1 | Adobe$_{YCC601}$ |
| 1 | 0 | 0 | Adobe$_{RGB}$ |
| 1 | 0 | 1 | ITU-R BT.2020 Y'$_C$C'$_{BC}$C'$_{RC}$ |
| 1 | 1 | 0 | ITU-R BT.2020 R'G'B' or Y'C'$_B$C'$_R$ |
| 1 | 1 | 1 | Reserved |

18030

18060

| EC2 | EC1 | EC0 | Extended Colorimetry |
|---|---|---|---|
| 1 | 1 | 1 | Colorimetry Extension Valid |

18040

| EC2 | EC1 | EC0 | Colorimetry Extension |
|---|---|---|---|
| 0 | 0 | 0 | Unspecified colorimetry |
| 0 | 0 | 1 | DCI-P3 |

18050

| InfoFrame Type Code | InfoFrame Type = 0×07 | | | | | |
|---|---|---|---|---|---|---|
| InfoFrame Version Number | Version = 0×01 | | | | | |
| Length of Info Frame | Length of following HDR Metadata InfoFrame | | | | | |
| Data Byte 1 | CE2 | CE1 | CE0 | F14 = 0 | F13 = 0 | EOTF (3 bits) |
| Data Byte 2 | F27 = 0 | F26 = 0 | F26 = 0 | F24 = 0 | F23 = 0 | Static_Metadata_ Descriptor ID (3 bits) |
| Data Byte 3 | Static_Metadata_Descriptor | | | | | |
| ... | ... | | | | | |
| Data Byte n | ... | | | | | |

FIG. 19

| InfoFrame Type Code | InfoFrame Type = 0×02 | | | | | | | |
|---|---|---|---|---|---|---|---|---|
| InfoFrame Version Number | Version = 0×02 or [0×03] | | | | | | | |
| Length of AVI InfoFrame | Length of AVI InfoFrame (13) | | | | | | | |
| Data Byte 1 | [Y2] | Y1 | Y0 | A0 | B1 | B0 | S1 | S0 |
| Data Byte 2 | C1 | C0 | M1 | M0 | R3 | R2 | R1 | R0 |
| Data Byte 3 | ITC | EC2 | EC1 | EC0 | Q1 | Q0 | SC1 | SC0 |
| Data Byte 4 | [VIC7] | VIC6 | VIC5 | VIC4 | VIC3 | VIC2 | VIC1 | VIC0 |
| Data Byte 5 | VQ1 | VQ2 | CN1 | CN0 | PR3 | PR2 | PR1 | PR0 |
| Data Byte 6 | ETB07-ETB00 (Line Number of End of Top Bar - lower 8 bits) | | | | | | | |
| Data Byte 7 | ETB15-ETB08 (Line Number of End of Top Bar - upper 8 bits) | | | | | | | |
| Data Byte 8 | SBB07-SBB00 (Line Number of Start of Bottom Bar - lower 8 bits) | | | | | | | |
| Data Byte 9 | SBB15-SBB08 (Line Number of Start of Bottom Bar - upper 8 bits) | | | | | | | |
| Data Byte 10 | ELB07-ELB00 (Pixel Number of End of Left Bar - lower 8 bits) | | | | | | | |
| Data Byte 11 | ELB15-ELB08 (Pixel Number of End of Left Bar - upper 8 bits) | | | | | | | |
| Data Byte 12 | SRB07-SBB00 (Pixel Number of Start of Right Bar - lower 8 bits) | | | | | | | |
| Data Byte 13 | SRB15-SBB08 (Pixel Number of Start of Right Bar - upper 8 bits) | | | | | | | |
| Data Byte 14 | | | | | | CE2 | CE1 | CE0 |

| C1 | C0 | Colorimatry |
|---|---|---|
| 0 | 0 | No Data |
| 0 | 1 | SMPTE 179M [1] |
| 1 | 0 | ITU-R BT_709[7] |
| 1 | 1 | SMPTE 179M Extended Colorimetry Information Valid (colorimetry indicated in bits EC0, EC1,and EC2. See Table 12) |

| EC2 | EC1 | EC0 | Extended Colorimatry |
|---|---|---|---|
| 0 | 0 | 0 | xvYCC$_{601}$ |
| 0 | 0 | 1 | xvYCC$_{709}$ |
| 0 | 1 | 0 | sYCC$_{601}$ |
| 0 | 1 | 1 | Adobe$_{YCC601}$ |
| 1 | 0 | 0 | Adobe$_{RGB}$ |
| 1 | 0 | 1 | ITU-R BT.2020 Y'$_C$ C'$_{BC}$ C'$_{RC}$ |
| 1 | 1 | 0 | ITU-R BT.2020 R'G'B' or Y'C'$_B$C'$_R$ |
| 1 | 1 | 1 | Reserved |

| EC2 | EC1 | EC0 | Colorimetry Extension |
|---|---|---|---|
| 0 | 0 | 0 | Unspecified colorimetry |
| 0 | 0 | 1 | DCI-P3 |

| EC2 | EC1 | EC0 | Extended Colorimetry |
|---|---|---|---|
| 1 | 1 | 1 | Colorimetry Extension Valid |

FIG. 20

| Offset | Value | | | | | | | | Description/Format |
|---|---|---|---|---|---|---|---|---|---|
| 0x00 | 0x14 | | | | | | | | HDR Data Block |
| 0x01 | 7 | 6 | 5 | 4 | 3 | 2 | 1 | 0 | BLOCK Revision and Other Data |
|  | _ | _ | _ | _ | _ | 0 | 0 | 0 | REVISION '0' |
|  | 0 | 0 | 0 | 0 | 0 | _ | _ | _ | RESERVED (BLOCK SPECIFIC) |
| 0x02 | | | | | | | | | Number Of Payload Bytes |
| 0x03 | Descriptor | | | | | | | | Control option flag |
| 0x04<br>0x05 | Descriptor | | | | | | | | Sink Device Dynamic Range |
| 0x06 | Descriptor | | | | | | | | Transfer Function Type flag |
| 0x07 ~<br>0x0A | Descriptor | | | | | | | | Unspecified TF details |
| 0x0B~ | Descriptor | | | | | | | | Unspecified TF coefficients<br>(TF_coefficient 1 ... TF_coefficient N) |

FIG. 21

| Offset | Value | | | | | | | | Description/Format |
|---|---|---|---|---|---|---|---|---|---|
| 0x06 | 7 | 6 | 5 | 4 | 3 | 2 | 1 | 0 | Transfer Function Type flag |
| | 1 | _ | _ | _ | _ | _ | _ | _ | Unspecified Transfer Function |
| | _ | 1 | _ | _ | _ | _ | _ | _ | BT.1886 |
| | _ | _ | 1 | _ | _ | _ | _ | _ | SMPTE ST 2084 |
| | _ | _ | _ | Reserved | | | | | reserved |
| | 7 | 6 | 5 | 4 | 3 | 2 | 1 | 0 | Unspecified TF Details |
| 0x07 | 0x0 -> 0xF | | | | _ | _ | _ | _ | Type of Unspecified Transfer Function |
| | _ | _ | _ | _ | 0x0 -> 0xF | | | | Number of coefficients in Unspecified Transfer Function |
| 0x08 | 0~3 | | | _ | _ | _ | _ | _ | Number of types |
| | _ | _ | 0~3 | | _ | _ | _ | _ | Bitdepth |
| | _ | _ | _ | Reserved | | | | | reserved |
| 0x09 | 0x00 -> 0xFF | | | | | | | | Lowest Brightness level of Sink device (higher 8 bits) |
| 0x0A | 1 | _ | _ | _ | _ | _ | _ | _ | Lowest Brightness level of Sink device (LSB) |
| | _ | 0x00 -> 0x3F | | | | | | | Highest Brightness level of Sink device (total 7 bits) |
| | 7 | 6 | 5 | 4 | 3 | 2 | 1 | 0 | Unspecified TF coefficients |
| 0x0B | 0x00 -> 0xFF | | | | | | | | TF_coefficient 1 |
| ... | ... | | | | | | | | ... |
| | 0x00 -> 0xFF | | | | | | | | TF_coefficient N |

VIDEO DATA PROCESSING METHOD AND DEVICE FOR DISPLAY ADAPTIVE VIDEO PLAYBACK

This application claims the benefit of U.S. Provisional Patent Application No. 62/034,792, filed on Aug. 8, 2014, which is hereby incorporated by reference as if fully set forth herein.

BACKGROUND OF THE INVENTION

Field of the Invention

The present invention relates to processing of video data and, more particularly, to a video data processing method and device for display adaptive video playback.

Discussion of the Related Art

As a video signal processing rate has increased, research into a method for encoding/decoding ultra high definition (UHD) video has been conducted.

UHD content is aimed at providing improved image quality as compared to existing content. Research into and development of a UHD video element have been conducted in various fields in addition to a broadcast field. A demand for providing an improved user experience, which has not been provided by existing content in terms of color and brightness, has increased.

Therefore, efforts to increase the ranges of color and brightness among various elements configuring UHD video to provide a high-quality image have been continuously made.

A UHD display device is different from an existing display device in terms of improvement of color and brightness.

However, under various display device conditions, technology for optimally viewing UHD content has not been developed.

For example, if UHD content is supplied via a next-generation display device, the color or brightness of an image may be restricted according to the physical properties of a display device and thus content may not be appropriately displayed.

In order to adaptively control the color and brightness of content according to display device, content transformation should be performed based on accurate analysis of the properties of the display device. However, if UHD content is supplied via an external device, delivery of the properties of the display device may be restricted.

SUMMARY OF THE INVENTION

Accordingly, the present invention is directed a video data processing method and device for display adaptive video playback that substantially obviate one or more problems due to limitations and disadvantages of the related art.

An object of the present invention is to provide a video processing method and a video processing device capable of allowing a viewer to optimally view content including UHD content under various display device conditions.

Another object of the present invention devised is to provide a video processing method and a video processing device capable of reducing color or brightness restrictions according to the physical properties of display devices when content including UHD content is displayed on various display devices.

A further object of the present invention is to provide a video processing method and a video processing device capable of allowing a viewer to optimally view content including UHD content by delivering the properties of a display device even when content including the UHD content is supplied via an external device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a video data processing method includes transmitting extended display identification data (EDID) indicating capabilities of a sink device to a source device via an interface, the EDID including electro optical transfer function (EOTF) type information for identifying EOTF supported by the sink device, receiving video data from the source device via the interface, and playing the received video data back.

Preferably, the EDID includes high dynamic range (HDR) static metadata indicating HDR capabilities of the sink device and the HDR static metadata includes the EOTF type information.

Preferably, the HDR static metadata is included and transmitted in a data block and the HDR static metadata includes information for identifying that the data block includes the HDR static metadata and information indicating the length of the data block.

Preferably, the video data processing method further includes receiving video characteristics information indicating characteristics of the video data from the source device via the interface, wherein the video characteristics information includes at least one of information indicating that there is an extension of colorimetry and information indicating the extended colorimetry.

In other aspect of the present invention, a video data processing device includes a transmission unit configured to transmit extended display identification data (EDID) indicating capabilities of a sink device to a source device via an interface, the EDID including electro optical transfer function (EOTF) type information for identifying EOTF supported by the sink device, a video reception unit configured to receive video data from the source device via the interface, and a playback unit configured to play the received video data back.

Preferably, the EDID includes high dynamic range (HDR) static metadata indicating HDR capabilities of the sink device and the HDR static metadata includes the EOTF type information.

Preferably, the HDR static metadata is included and transmitted in a data block and the HDR static metadata includes information for identifying that the data block includes the HDR static metadata and information indicating the length of the data block.

Preferably, the video data processing device further includes a signaling reception unit configured to receive video characteristics information indicating characteristics of the video data from the source device via the interface, wherein the video characteristics information includes at least one of information indicating that there is an extension of colorimetry and information indicating the extended colorimetry.

In other aspect of the present invention, a video data processing method includes receiving extended display identification data (EDID) indicating capabilities of a sink device from the sink device via an interface, the EDID including electro optical transfer function (EOTF) type information for identifying EOTF supported by the sink device, and transmitting video data to the sink device via the interface.

Preferably, the EDID includes high dynamic range (HDR) static metadata indicating HDR capabilities of the sink device and the HDR static metadata includes the EOTF type information.

Preferably, the HDR static metadata is included and transmitted in a data block and the HDR static metadata includes information for identifying that the data block includes the HDR static metadata and information indicating the length of the data block.

Preferably, the video data processing method further includes transmitting video characteristics information indicating characteristics of the video data to the sink device via the interface, wherein the video characteristics information includes at least one of information indicating that there is an extension of colorimetry and information indicating the extended colorimetry.

In other aspect of the present invention, a video data processing device includes a reception unit configured to receive extended display identification data (EDID) indicating capabilities of a sink device from the sink device via an interface, the EDID including electro optical transfer function (EOTF) type information for identifying EOTF supported by the sink device, and a transmission unit configured to transmit video data to the sink device via the interface.

Preferably, the EDID includes high dynamic range (HDR) static metadata indicating HDR capabilities of the sink device and the HDR static metadata includes the EOTF type information.

Preferably, the HDR static metadata is included and transmitted in a data block and the HDR static metadata includes information for identifying that the data block includes the HDR static metadata and information indicating the length of the data block.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 is a diagram showing an example of information delivered from the sink device to the source device according to an embodiment of the present invention.

FIG. 5 is a diagram showing a detailed field value of the above-described embodiment as an example of information delivered from the sink device to the source device according to an embodiment of the present invention.

FIG. 6 is a diagram showing a detailed example of a control option flag according to an embodiment of the present invention.

FIG. 7 is a diagram showing a detailed example of sink device dynamic range information according to an embodiment of the present invention.

FIG. 8 is a diagram showing a display parameters data block of a DisplayID as the display related information transmitted from the sink device to the source device according to an embodiment of the present invention.

FIG. 9 is a diagram showing a display device data block as the display related information described in an embodiment of the present invention.

FIG. 10 is a diagram showing another example of delivering the display related information from the sink device to the source device according to one embodiment of the present invention.

FIG. 11 is a diagram showing information to be delivered from the source device to the sink device according to an embodiment of the present invention.

FIG. 12 is a diagram showing a detailed example of post processing type information disclosed according to an embodiment of the present invention.

FIG. 13 is a diagram showing a detailed example of original color gamut information Orig_color_gamut according to an embodiment of the present invention.

FIG. 14 is a diagram showing another example of delivering video color information from the source device to the sink device according to an embodiment of the present invention.

FIG. 16 is a diagram showing the configuration of an EOTF type according to one embodiment of the present invention.

FIG. 18 is a diagram showing a method of signaling a DCI-P3 color gamut according to another embodiment of the present invention.

FIG. 19 is a diagram showing a method of signaling a DCI-P3 color gamut according to another embodiment of the present invention.

FIG. 20 is a diagram showing information on a transfer function which may be processed by the sink device according to one embodiment of the present invention.

FIG. 21 is a diagram showing detailed field values used in a method of delivering information on a transfer function which may be processed by the sink device according to one embodiment of the present invention.

DETAILED DESCRIPTION OF THE INVENTION

Reference will now be made in detail to the preferred embodiments of the present invention, examples of which are illustrated in the accompanying drawings. However, the invention should not be limited to the specific embodiments described herein.

Although the terms used in the present invention are selected from generally known and used terms, terms used herein may vary depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

Figure 1:
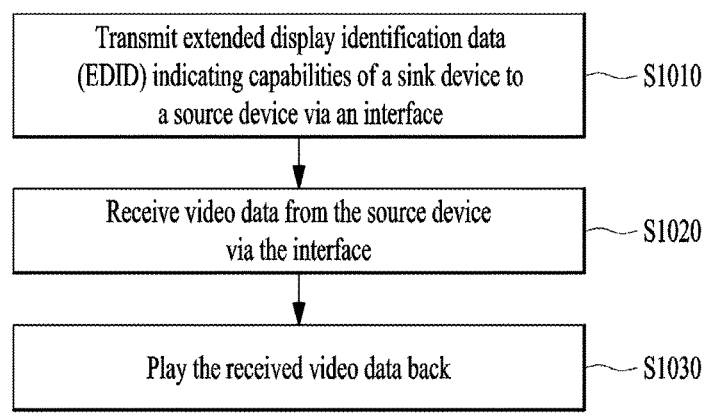
FIG. 1 is a diagram showing a video data processing method according to one embodiment of the present invention.

FIG. 1 is a diagram showing a video data processing method according to one embodiment of the present invention.

The video data processing method according to one embodiment of the present invention may include step S1010 of transmitting extended display identification data (EDID) indicating capabilities of a sink device to a source device via an interface, step S1020 of receiving video data from the source device via the interface, and step S1030 of playing the received video data back. Here, EDID may include electro optical transfer function (EOTE) type information for identifying an EOTF supported by the sink device. The EDID will be described in detail below with reference to FIGS. 20 and 21. In addition, the overall processing procedure will be described in detail below with reference to FIG. 15.

According to another embodiment of the present invention, the EDID may include high dynamic range (HDR) static metadata indicating HDR capabilities of the sink device. Further, the HDR static metadata may include EOTF type information. This will be described in detail below with reference to FIGS. 20 and 21.

According to another embodiment of the present invention, the HDR static metadata may be included and transmitted in a data block. The HDR static metadata may include information for identifying that the data block includes HDR static metadata and/or information indicating the length of the data block. This will be described in detail below with reference to FIG. 20.

According to another embodiment of the present invention, the above-described video data processing method may further include step of receiving video characteristics information indicating the characteristics of the video data from the source device via the interface. Here, the video characteristics information may include information indicating that there is an extension of colorimetry and/or information indicating extended colorimetry. This will be described in detail below with reference to FIGS. 17, 18 and 19.

Figure 2:
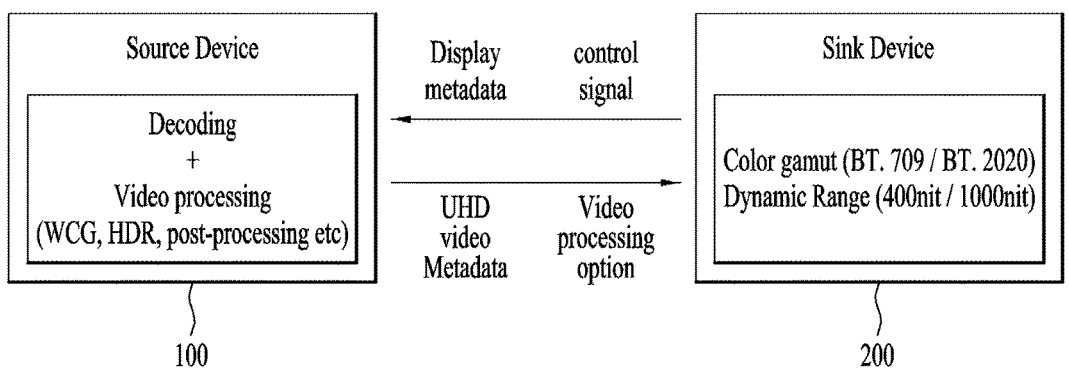
FIG. 2 is a diagram showing an example of connecting a source device and a sink device in order to transmit and receive a video image.

FIG. 2 is a diagram showing an example of connecting a source device and a sink device in order to transmit and receive a video image. Referring to this figure, the source device capable of performing image decoding and image quality processing and the sink device capable of outputting an image exchange information will now be described.

The source device 100 includes a device for decoding images received via various routes, such as broadcast, storage media such as Blu-ray, ultraviolet (UV) or secure content storage association (SCSA), or Internet protocol (IP) streaming, or a device capable of performing video processing for image quality processing. For example, the source device includes set-top boxes, players of storage media such as Blu-ray disc (BD) players, computers, etc.

Video processing of the source device 100 may include a method for changing image quality, such as wide color gamut (WCG), high dynamic range (HDR) or other post processing. In this case, video processing is not uniformly performed, but whether a video source can be played back on a display device is determined based on display information provided by the sink device, e.g., color gamut information or dynamic range information, and the image is converted into image quality suitable for the display device and provided thereto.

In addition, if the video processing procedure of the source device 100 needs to be controlled by the sink device 200, information about which video processing procedure is used may be received from the source device 100.

The source device 100 may receive display-related metainformation or display option information from the sink device 200. Based on the received information, the source device 100 may provide UHD video metadata and processing option information of processed video to the sink device 200. The sink device 200 may display video processed by the source device 100 based on the data or information provided by the source device 100. The sink device 200 may display video processed by the source device 100 according to the color gamut information suitable for the display or within the dynamic range.

Figure 3:
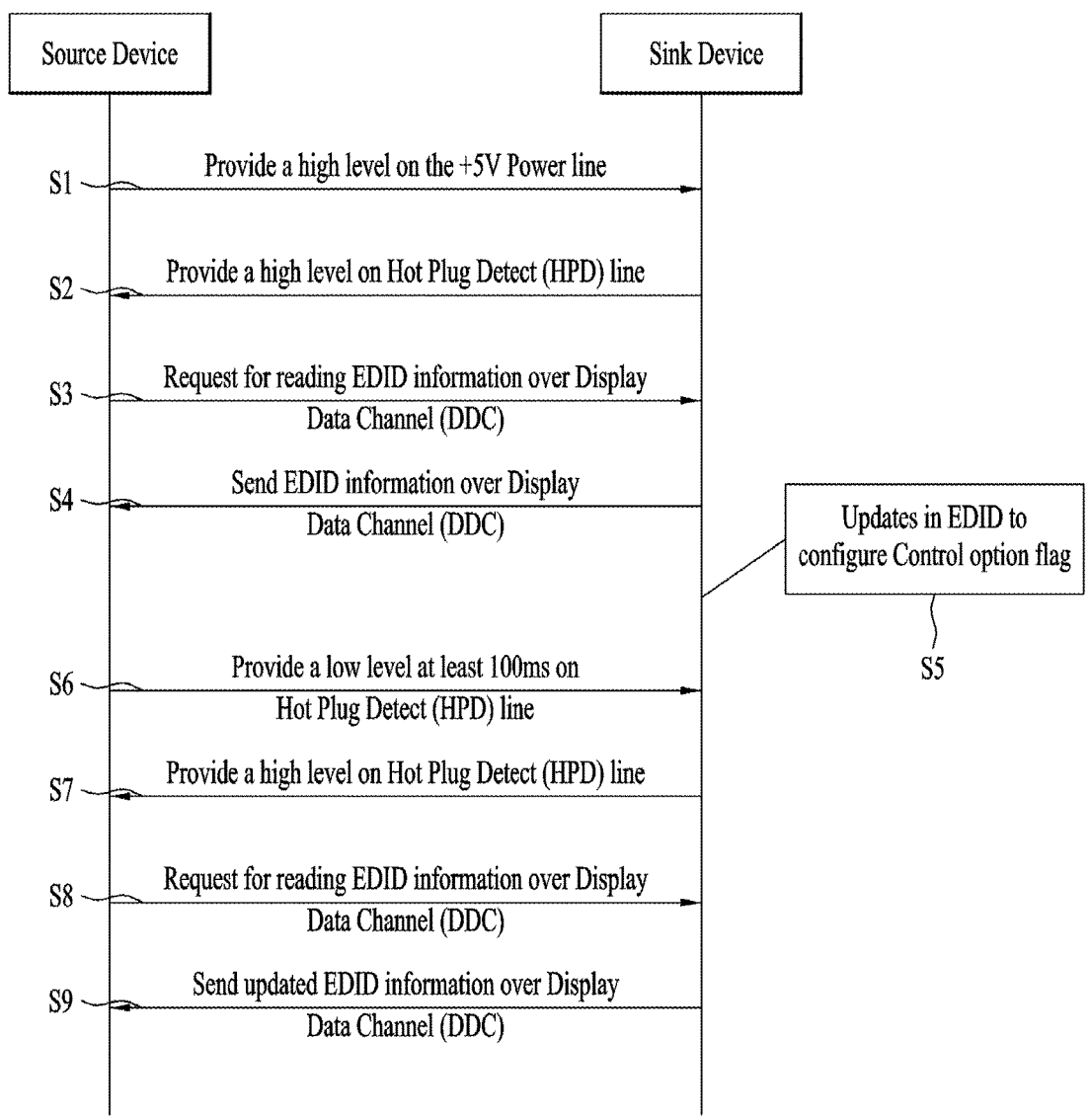
FIG. 3 is a diagram showing an embodiment of transmitting and receiving information when the source device is connected to the sink device according to an embodiment of the present invention.

FIG. 3 is a diagram showing an embodiment of transmitting and receiving information when the source device is connected to the sink device according to an embodiment of the present invention.

This example shows the case in which the source device is connected to the sink device via a wired interface such as a high definition multimedia interface (HDMI) or a DisplayPort. This example shows an embodiment in which, when the source device and the sink device are connected via the wired interface, the sink device 200 controls (activation or deactivation of) a high dynamic range (HDR) and WCG function of the source device 100 via a data block of the HDR of extended display identification data (EDID) and the source device reads the changed EDID of the sink device.

When the source device is connected to the sink device via the wired interface, the source device provides a high-level voltage on a +5V power line of the wired interface and the sink device confirms that the source device is connected (S1).

The sink device provides a high-level voltage on a hot plug detect line maintained at a low-level voltage to inform the source device that completion of connection with the sink device and display related information such as EDID (hereinafter, referred to as display related information) is ready to be read (S2).

The source device confirms that the hot plug detect line transitions to a high level and makes a request for reading the display related information from the sink device via a display data channel (S3) and the sink device transmits the display related information to the source device via the display data channel (S4).

When a field of a control option flag of an HDR data block of the display related information is changed by functional determination of the sink device or is signaled according to a user request (S5), the sink device provides a low-level voltage on the hot plug detect line and maintains this voltage for a predetermined time, for example, at least 100 ms, in order to inform the source device of the updated information of the display related information (S6).

When the source device can read the display related information, the sink device provides a high-level voltage to the hot plug line (S7) and the source device detects the high-level voltage and makes a request for reading the display related information via the display data channel (S8). Then, the sink device transmits the changed display related information via the display data channel (S9).

Based on such operation, an example of exchanging information between the source device and the sink device according to an embodiment of the present invention will be described.

According to the embodiment of the present invention, in response to the request of step S3 or S8, the sink device may deliver color gamut information and brightness information to the source device (included in S4 or S9).

The color gamut information may include color primary coordinates on a CIE xy diagram of a color gamut corresponding RGBW or color gamut information such as BT. 709 or BT. 2020. This information may be delivered via the color characteristics data block of a DisplayID defined in an interface. Brightness related information may include a maximum brightness value or minimum brightness value and may be delivered using a datablock defined in DisplayID, EDID or EDID extension information, etc. of the interface according to the example disclosed in the embodiment.

Then, the source device determines whether the color or brightness information of video needs to be adjusted based on the delivered display related information. If it is determined that the color or brightness information needs to be adjusted, the source device may perform transformation based on color mapping or dynamic range mapping information provided by video or autonomously provide color or brightness information of video.

The source device delivers final video obtained by adjustment to the sink device. At this time, color gamut or dynamic range related metadata of the final video may be delivered via an InfoFrame of the interface. The color gamut information may be delivered using color gamut information (e.g., BT. 709, BT. 2020, etc.) pre-defined in an AVI infoFrame of the interface. The dynamic range metadata related information may deliver maximum or minimum brightness information and may be delivered via a method of defining a new InfoFrame using the methods described in the embodiments or a method of extending an AVI InfoFrame.

If information on video processing of the source device needs to be provided when the source device delivers the final video, processing information of a video processing unit, such as HDR information or WCG information, may be delivered using post_processing_type in the InfoFrame via the methods described in the embodiments. In addition, if color transformation function information such as a new electro-optical transfer function (EOTF) needs to be defined and used in association with the HDR information of the final video, information on a new color transformation function may be delivered using an interface information flag.

The sink device determines whether processing of the final video by the source device is suitable and determines whether the source device needs to be controlled via feedback. In this case, the source device may be controlled via a control option flag in a datablock defined in DisplayID, EDID, EDID extension information, etc. described in the embodiments. If the result of video processing of the source device, such as WCG information or HDR information, is suitable, the sink device may activate bits related to the WCG information or HDR information such that the same processing continues.

If processing is unsuitable, the sink device may deactivate the bits related to the WCG information or HDR information to stop video processing.

The sink device changes video processing based on information included in the control option flag if the information delivered via the control option flag is different from video processing of the source device. If UHD video metadata is changed in association with changed video processing, the color characteristics information and brightness information in the InfoFrame may be changed and updated according to a video processing procedure with a changed post_processing_type. Then, step S5 is performed.

Hereinafter, information delivered from the sink device to the source will be described.

According to the embodiment of the present invention, if the source device processes HDR related information, the source device may perform video processing suitable for the sink device based on playback information of the sink device. In this case, the sink device may deliver information on a display dynamic range, e.g., sink black luminance level or sink white luminance level and a flag for controlling post processing of the source device to the source device. In this case, the data block of the DisplayID, EDID or EDID extension may be used, which will now be described in detail.

FIG. 4 is a diagram showing an example of information delivered from the sink device to the source device according to an embodiment of the present invention.

This figure shows an example of information delivered from the source device to the sink device using a data block of a DisplayID.

This figure shows an offset field and value field of the data block of the DisplayID and a description and format thereof. For example, if the offset field of the data block of the DisplayID is 0x00 and the value field is 0x14, an HDR data block may be indicated.

As shown in the figure, if the offset field is 0x03, a flag (control option flag) for controlling post processing of the source device may be indicated. A detailed example of the value will be described below.

If the offset field is 0x04 or 0x05, information on a brightness value (sink black luminance level, sink white luminance level, etc.) expressed by the sink device may be delivered.

The data block of the DisplayID may further include information necessary for video processing according to the offset field value. For example, if the offset field is 0x03, HDR related post processing related information may be delivered using a current reserved field, etc.

Here, the value of the offset field or the value field may be arbitrarily changed and a detailed example of the control option flag and an example of display information of the sink device will be described below.

FIG. 5 is a diagram showing a detailed field value of the above-described embodiment as an example of information delivered from the sink device to the source device according to an embodiment of the present invention.

As the information delivered from the sink device to the source device, the control option flag of the data block of the DisplayID is a field for controlling (on/off) a post processing procedure performed by the source device. According to the embodiment of the present invention, using this flag, various options to be provided in the future over the interface of the source/sink device may be indicated. Here, HDR and WCG related options are disclosed.

As described above, if the offset field of the data block of the DisplayID is 0x03, the control option flag for controlling the source device may be indicated. According to the bit location of the value field, HDR processing of the source device may be activated or WCG processing of the source device may be activated. In this example, this information is expressed using lower 2 bits.

The field disclosed in the present embodiment may be signaled by user request or controlled by functional determination of the sink device (if the processing capabilities of the sink device exceed those of the source device). In the embodiment of the present invention, information exchange between the sink and source devices may be performed with respect to frame rate control (FRC) and multilayer video enhancement function using reserved bits. Here, the offset field or the value field is an arbitrary value and may be changed.

FIG. 6 is a diagram showing a detailed example of a control option flag according to an embodiment of the present invention.

Information for controlling HDR and WCG processing performed by the source device may be set in lower 2 bits of the value field of the offset field of the control option flag. The following examples may be used by combinations of two flags.

In this example, if the value field is 00000000, this indicates that the source device does not perform any processing. For example, if the value field is 10000000, this indicates information on HDR processing of the source device, that is, indicates an option that the source device only performs HDR processing. As another example, if the value field is 01000000, this indicates information on WCG processing of the source device, that is, indicates an option that the source device only performs WCG processing.

As another example, if the value field is 11000000, this indicates control option information indicating that the source device performs both HDR and WCG processing based on the information delivered by the sink device, which may be used as an initial value.

FIG. 7 is a diagram showing a detailed example of sink device dynamic range information according to an embodiment of the present invention.

As shown, the sink device may deliver the dynamic range information of the sink device to the source device using the data block of the DisplayID and inform the source device of brightness information, etc. of the sink device.

The dynamic range information of the sink device indicates maximum and minimum physical brightness values (in nit or cd/m2) expressing the dynamic range of the display of the sink device.

For example, if the offset field of the data block of the DisplayID is 0x04 or 0x05, this indicates the dynamic range information of the sink device.

In this example, if the offset field of the data block of the DisplayID is 0x04, the brightness information of the lowest level of the sink device may be indicated using 8 bits higher than lower 8 bits.

If the offset field of the data block of the DisplayID is 0x05, the least significant bit (1 bit) of the value field indicates the brightness information of the lowest level of the sink device and the remaining bits of the value field indicate the brightness information of the highest level of the sink device.

Here, the offset field or the value field is an arbitrary value and may be changed.

The minimum brightness information (denoted by sink_black_luminance_level) and the maximum brightness information (sink_white_luminance_level) of the sink device indicated using this information are as follows.

For example, the minimum brightness information (sink_black_luminance_level) of the sink device indicates the minimum brightness of the display and may be expressed in units of 0.0001 in a range of 0 to 0.05 in consideration of general lowest brightness. That is, when the physical brightness of the display is brightness_black (in cd/m$^2$), real minimum brightness may be calculated from the minimum brightness information (sink_black_luminance_level) as follows.

Brightness_black=sink_black_luminance_level×10000

(0<=sink_black_luminance_level<=500<29)

For example, in case of a reference monitor, minimum reference brightness is 0.05 cd/m$^2$ and 500 obtained by multiplying the minimum reference brightness by 10000 (decimal number) may be transmitted.

The maximum brightness information (sink_white_luminance_level) of the sink device indicates the maximum brightness of the display and may be expressed in units of 100 in a range of 100 to 10000 in consideration of general highest brightness. That is, when the physical brightness of the display is brightness_white (in cd/m$^2$), real maximum brightness may be calculated from the maximum brightness information (sink_white_luminance_level) as follows.

Brightness_white=sink_white_luminance_level×100

(1<=sink_white_luminance_level<=100<27)

For example, in case of a reference monitor, maximum reference brightness is 100 cd/m$^2$ and 1 which is a quotient of the maximum reference brightness divided by 100 (decimal number) may be transmitted.

According to one embodiment of the present invention, the maximum brightness information of the sink device and/or the minimum brightness information of the sink device may indicate capabilities of the dynamic range of the display. That is, the maximum brightness information and/or the minimum brightness information of the sink device according to one embodiment of the present invention may indicate desired content max luminance data and/or desired content min luminance data necessary to optimally render content in consideration of capabilities of the display.

Another embodiment of delivering the display related information from the sink device to the source device will now be described.

FIG. 8 is a diagram showing a display parameters data block of a DisplayID as the display related information transmitted from the sink device to the source device according to an embodiment of the present invention.

As the display related information, the display parameters data block of the DisplayID may include all parameters of a monitor. As shown in this figure, the display parameters data block includes a horizontal or vertical image size (the offset field is 0x03 or 0x04), a horizontal or vertical pixel count (the offset field is 0x05 or 0x06), a flag indicating a function supportable by the monitor (the offset field is 0x0B), a gamma used in a transformation function (the offset field is 0x0C), a display aspect ratio (the offset field is 0x0D) and a pixel bit depth (the offset field is 0x0E).

According to the embodiment of the present invention, the display parameters data block may include the above-described control option flag information and sink device dynamic range information. That is, according to the embodiment of the present invention, the sink device may deliver the display parameters data block information including the above-described control option flag and sink device dynamic range information to the source device.

In this embodiment, if the offset field of the display parameters data block is 0x0F, this may indicate a control option flag and, if the offset field is 0x10 or 0x11, information on the brightness value (Sink Black Luminance Level, Sink White Luminance Level, etc.) of the sink device may be included.

The value field of the control option flag if the offset field is 0x0F, the value field of the sink device dynamic range information if the offset field is 0x10 or 0x11 and descriptions of the value fields are shown in FIGS. 5 to 7. Here, the offset field or the value field is an arbitrary value and may be changed.

In the embodiment of the present invention, transfer curve information suitable for HDR may be delivered via transfer characteristic gamma.

Another embodiment of delivering the display related information from the sink device to the source device will now be described.

FIG. 9 is a diagram showing a display device data block as the display related information described in an embodiment of the present invention. In the embodiment of the present invention, an example of information delivered from the source device to the sink device using the display device data block is described.

The display device data block includes information indicating the characteristics of the display panel. The display device data block includes display device technology (the offset field is 0x03), the operating mode of the display device (the offset field is 0x04), a video size expressible by a pixel count (the offset field is 0x05 to 0x08), a display aspect ratio (the offset field is 0x09 to 0x0A), a bit depth (the offset field is 0x0E) and a response time (the offset field is 0x0F). In the embodiment of the present invention, as shown in this figure, the control option flag information and the sink device dynamic range information of the display panel may be delivered to the source device in addition to the display device data block.

According to the embodiment of the present invention, if the offset field of the display device data block is 0x0F, this may indicate the control option flag and, if the offset field of the display device data block is 0x10 or 0x11, this may indicate the sink device dynamic range information.

The example of the value field if the offset field of the display device data block is 0x0F and the example of the value field if the offset field of the display device data block is 0x10 or 0x11 is shown in FIGS. 5 to 7 or FIG. 8. Here, the offset field or the value field is an arbitrary value and may be changed.

As another example of delivering the display related information from the sink device to the source device, the sink device may deliver the control option flag and the sink device dynamic range information using a vendor-specific data block of a DisplayID. The vendor-specific data block is data used when the sink device delivers information which is not defined in the data block and the above-described control option flag and sink device dynamic range information may be included in this data block.

As another example of delivering the display related information from the sink device to the source device, the sink device may use a product identification data block of the DisplayID.

The product identification data block of the DisplayID may include information on a manufacturer of a display device, a serial number of a display device, a product ID. etc. At this time, if the sink device can check information on each product via the manufacturer, manufacture date, and product ID of a display device, dynamic range information of each product may be delivered to the source device using this information. According to the present invention, if the product identification data block of the DisplayID indicates dynamic range information as the ID of the product, the control option flag is delivered using any one of the above-described embodiments.

As another example of delivering the display related information from the sink device to the source device, the sink device may deliver the display related information to the source device using a transfer characteristics data block. The transfer characteristics data block is a data block for delivering transfer curve related information of the display. The transfer characteristics data block is a data block indicating use of an arbitrary gamma function or support of a piecewise linear curve. Since a part defining peak luminance and lowest luminance of the display panel is not present, the sink device may deliver, to the source device, dynamic range information obtained by including the above-described control option flag and sink device dynamic range information in the transfer characteristics data block.

FIG. 10 is a diagram showing another example of delivering the display related information from the sink device to the source device according to one embodiment of the present invention. According to the embodiment of the present invention, the sink device may deliver the display related information to the source device using consumer electronics association (CEA) EDID extension information.

The sink device may deliver CEA EDID extension information including device attribute information supportable by the CE sink device to the source device in addition to the EDID defined in VESA of CEA-861. In this case, the sink device may deliver the dynamic range information shown in this figure to the source device.

The extension data block of the CEA EDID extension information may include video, audio, speaker allocation, vendor-specific and video capability data blocks. In order to identify the extension data block, a predefined tag code may be included bits 5 to 7 of a first byte of each data block.

According to the embodiment of the present invention, bits 5 to 7 of the first byte of the CEA EDID extension data block may include a tag code representing dynamic range information.

As shown in the figure, in the CEA EDID extension data block, the dynamic range information may be represented by minimum brightness information of the sink device (8 bits higher than lower 8 bits of the lowest brightness level of the sink device), LSB information of the minimum brightness of the sink device (lowest brightness level of the sink device (LSB)) and the maximum brightness information of the sink device (highest brightness level of the sink device (total 7 bits)) as described above. Bit allocation is arbitrary and may be changed. Accordingly, according to the embodiment of the present invention, the sink device may deliver the maximum/minimum brightness information of the sink device of the display related information to the source device using the CEA EDID extension information.

The maximum brightness information of the sink device according to one embodiment of the present invention may indicate the maximum brightness information capable of being processed by the sink device and the minimum brightness information of the sink device may indicate the minimum brightness information capable of being processed by the sink device.

Next, information to be delivered from the source device to the sink device according to an embodiment of the present invention will be described.

The source device may determine whether brightness and color gamut of content is suitable for the sink device based on the display related information and color gamut related information of the sink device and transform the brightness and color gamut of the content if necessary. In this case, if UHD video is processed, the source device should deliver information on which processing is performed and information on brightness and color gamut after video processing to the sink device. This is to control post processing of the sink device and this embodiment will now be described in detail.

According to the embodiment of the present invention, the source device may deliver UHD video processing related information to the sink device via an InfoFrame defined in CEA 861.

FIG. 11 is a diagram showing information to be delivered from the source device to the sink device according to an embodiment of the present invention.

In CEA 861, color gamut information of the InfoFrame defined as interface information of the source/sink device may be delivered via an AVI InfoFrame. In the embodiment of the present invention, the source device delivers information on UHD video processing to the sink device via the InfoFrame. Thereby, video processing information such as brightness information of UHD video, arbitrary color gamut information and HDR information or WCG information may be delivered to the sink device. According to the present embodiment, the source device may deliver information on post processing, brightness information of content after post processing, brightness information of content before post processing and color gamut information to the sink device.

The information on post processing includes information on the status of content and may be used as a response to a request of the sink device. The brightness information of the content after post processing may include minimum brightness information black_luminance_level of the content and maximum brightness information white_luminance_level of the content. The brightness information of the content before post processing may include minimum brightness information orig_black_luminance_level of the content and maximum brightness information orig_white_luminance_level of the content. The color gamut information of the content may be represented by Orig_color_gamut information. These will now be described in detail.

An InfoFrame type code indicates the type of this InfoFrame and may indicate a frame including information on UHD video processing if the value thereof is 0x07. Here, the information on UHD video processing may be referred to as dynamic range and mastering information. The dynamic range and mastering information according to one embodiment of the present invention may include dynamic range related information of content.

An infoFrame version number indicates the version information of this frame and length of HDR InfoFrame indicates the length information of HDR InfoFrame.

P3 to P0 fields of data byte 1 refer to fields for controlling (on/off) the prost processing procedure performed by the source device as a post_processing_type_flag. Here, using these fields, option information related to HDR information or WCG information is disclosed and a detailed description thereof will be given below. In one embodiment of the present invention, if content produced with BT. 709 is encoded and transmitted using BT. 2020, the contents color gamut and/or container color gamut may be distinguishably signaled using these fields and/or the below-described original color gamut Orig_color_gamut. This will be described in detail below.

R2 to R0 fields of data byte 1 indicate reserved bits and an E0 field indicates whether a new color transformation function (EOTF, etc.) is used via a new_EOTF_flag. The reserved bits are flags available in the future when a new EOTF suitable for HDR information is defined.

Data type 2 may include minimum brightness information of content and is represented by a black_luminance_level herein. In this embodiment, highest 8 bits of the minimum brightness information is represented in the data byte 2 field.

The minimum brightness information of content may be expressed in units of 0.0001 in a range of 0 to 0.05 in consideration of general lowest brightness. That is, when the physical brightness of the display is brightness_black (in cd/m$^2$), the following relationship is obtained.

$$\text{Brightness\_black}=\text{black\_luminance\_level}\times10000$$

$$(0<=\text{black\_luminance\_level}<=500<29)$$

For example, in case of a reference monitor, minimum reference brightness is 0.05 cd/m$^2$ and 500, obtained by multiplying the minimum reference brightness by 10000 (decimal number), may be expressed as brightness information.

Data byte 3 may include an LSB (1 bit) of minimum brightness information black_luminance_level of content and maximum brightness information (7 bits) white_luminance_level as shown in this figure.

The maximum brightness information white_luminance_level indicates the maximum brightness of the content and may be expressed in units of 100 in a range of 100 to 10000 in consideration of general highest brightness. That is, when the physical brightness of the display is brightness_white (in cd/m$^2$), the following relationship is obtained.

$$\text{Brightness\_white}=\text{white\_luminance\_level}\times100$$

$$(1<=\text{white\_luminance\_level}<=100<27)$$

For example, in case of a reference monitor, maximum reference brightness is 100 cd/m$^2$ and 1 which is a quotient of the maximum reference brightness divided by 100 (decimal number) may be expressed as brightness information.

Data byte 4 may express most significant bits (8 bits) of original minimum brightness information Orig_black_luminance_level of content and data byte 5 may express an LSB (1 bit) of original minimum brightness information Orig_black_luminance_level of content and original maximum brightness information Orig_white_luminance_level (7 bits) of content.

Original minimum brightness information Orig_black_luminance_level of content indicates the minimum brightness of content before HDR processing in the source device. The expression and range thereof are equal to those of black_luminance_level. In the present embodiment, the field may be transmitted only when HDR information indicates "on" in the post_processing_type.

Similarly, original maximum brightness information Orig_white_luminance_level of content indicates the maximum brightness of content before HDR processing in the source device. The expression and range thereof are equal to those of white_luminance_level. In the present embodiment, the field may be transmitted only when HDR information indicates "on" in post_processing_type.

According to one embodiment of the present invention, if signaling of the dynamic range differentiated from the contents dynamic range is necessary, original minimum brightness information Orig_black_luminance_level and the original maximum brightness information Orig_white_luminance_level may be used. At this time, the dynamic range differentiated from the contents dynamic range may include a dynamic range before and after image processing, a dynamic range used upon encoding, a dynamic range of a mastering display, a dynamic range of a target display, a dynamic range of a container, etc. Here, the dynamic range of the container may indicate a maximum/minimum dynamic range of the container when the dynamic range of original content and the dynamic range of the container are different. For example, the case in which the dynamic range of original content is different from the dynamic range of the container may include the case in which content produced in a low dynamic range (LDR) is encoded and transmitted in a high dynamic range (HDR), the case in which content produced in an HDR is encoded and transmitted in an LDR, the case in which content having a narrow dynamic range is transmitted to a container having a wide dynamic range, the case in which content having a wide dynamic range is transmitted to a container having a narrow dynamic range, etc. Here, the dynamic range of the container is different from the dynamic range of content and may indicate the dynamic range of the display. In addition, the mastering display may indicate a display subjected to a mastering procedure according to the brightness and/or color information of content and/or display. Accordingly, the dynamic range of the mastering display indicates the dynamic range supportable by the display.

Data type 6 may include original color gamut information Orig_color_gamut and S3 to S0 may include reserved bits. The original color gamut information Orig_color_gamut indicates the color gamut of content before WCG processing in the source device. Detailed examples of the standard color gamut will be described below. In the present embodiment, the field may be transmitted only when WCG indicates "on" in the post_processing_type.

In one embodiment of the present invention, if the source device does not perform separate color gamut mapping and the color gamut of the original content is different from that of the container, the value of the post_processing_type of 0000 (no processing) or 1111 (different color gamut) is signaled such that information on each color gamut is delivered to the display device while distinguishing between the contents color gamut and the container color gamut using the original color gamut information Orig_color_gamut. Here, the case in which the color gamut of the original content and the color gamut of the container are different may include the case in which content produced according to BT. 709 is encoded and transmitted with BT. 2020. In another embodiment of the present invention, the container color gamut may be expressed using colorimetry definition (C1, C0) of Data bytes 2 and 3 and extended colorimetry (EC2, EC1, EC0) in the AVI InfoFrame of CEA 861-F and the contents color gamut may be expressed using the Orig_color_gamut. In contrast, in another embodiment of the present invention, the contents color gamut may be expressed using colorimetry definition (C1, C0) of Data bytes 2 and 3 and extended colorimetry (EC2, EC1, EC0) in the AVI InfoFrame of CEA 861-F and the container color gamut may be expressed using the Orig_color_gamut. In another embodiment of the present invention, the contents color gamut may be expressed using the Orig_color_gamut and the container color gamut may be expressed using Red-x, Red-y, Green-x, Green-y, Blue-x, Blue-y, White-x and/or White-y. In contrast, in another embodiment of the present invention, the container color gamut may be expressed using the Orig_color_gamut and the contents color gamut may be expressed using Red-x, Red-y, Green-x, Green-y, Blue-x, Blue-y, White-x and/or White-y. Here, the container color gamut is different from the content color gamut and may indicate the display color gamut. Further, Orig_color_gamut, Red-x, Red-y, Green-x, Green-y, Blue-x, Blue-y, White-x and/or White-y may include chromaticity coordinates of three primary colors and/or white color of the container and/or display.

According to one embodiment of the present invention, if signaling of color gamut differentiated from contents color gamut is necessary, the above-described original gamut information Orig_color_gamut may be used. At this time, the color gamut different from the contents color gamut may include color gamut before and after image processing, container color gamut, color gamut used upon encoding, color gamut of a mastering display, color gamut of a target display, etc. Here, the mastering display may indicate a display subjected to a mastering procedure according to the brightness and/or color information of content and/or display. That is, color gamut of the mastering display indicates the color gamut supportable by the display.

Data byte 7 to data byte 16 refer to fields indicating arbitrary color gamut information. In this figure, arbitrary color gamut information include Red-x, Red-y, Green-x, Green-y, Blue-x, Blue-y, White-x and White-y.

Here, Red-x indicates an x coordinate of the R color of a color gamut (e.g., CIE 1931) using a value of 0 to 1 in the binary form. In the present embodiment, a total of 10 bits is used and higher 8 bits of data byte 9 and higher 2 bits of data byte 6 may be used.

Similarly, Red-y indicates a y coordinate of the R color of the color gamut (e.g., CIE 1931) using a value of 0 to 1 in the binary form. In the present embodiment, a total of 10 bits is used and higher 8 bits of data byte 10 and lower 2 bits of data byte 6 may be used.

The source device may deliver the color gamut information using data byte 7 to data byte 16 if appropriate information is not expressed in the original gamut information Orig_color_gamut of the content.

As another embodiment of the present invention, the original gamut information Orig_color_gamut shown in FIG. 11 is not used and the original gamut information may be used only using information corresponding to data byte 7 to data byte 16. Information corresponding to data byte 7 to data byte 16 is further used only when the original color gamut information Orig_color_gamut indicates a specific value.

Data byte 17 may include an E3 field, an E2 field, an E1 field, an E0 field and/or a number_of_coefficients field.

The E3 to E1 fields may be EOTF_type fields indicating the type of the EOTF used by a content producer for optimal image quality of HDR content. According to one embodiment of the present invention, a plurality of EOTF standards may be established and a content producer may arbitrarily define and use an EOTF. A detailed description of the meaning of the EOTF_type value will be given below.

The E0 field may indicate a private_EOTF_coeff_flag. If this field value is 1, this field may indicate that a separate coefficient is used according to EOTF_type. For example, if different coefficients are used for the same function, such as if a suitable EOTF coefficient is changed according to maximum brightness, in one embodiment of the present invention, a suitable coefficient may be transmitted using this field. In addition, according to another embodiment of the present invention, a separate parameter may be set and signaled via the EOTF_type. If this field value is 0, this field may indicate that a default parameter is used. Here, the parameter and the coefficient have the same meaning. According to one embodiment of the present invention, if the E0 field is 1, data bytes 18 to 18+N may be further used and, if the E0 field is 0, data bytes 18 to 18+N may not be used.

The number_of_coefficients field may indicate the number of coefficients used when the E0 field is 1.

Data type 18 may include an EOTF_additional_info field. The EOTF_additional_info field may indicate additional information according to the EOTF_type if additional information needs to be delivered according to the EOTF_type. For example, if a suitable EOTF coefficient is changed according to maximum brightness, this field may include information on target max brightness. According to one embodiment of the present invention, if coefficients of a plurality of EOTF functions according to various conditions need to be delivered according to the given EOTF_type, for example, if the coefficient is changed according to maximum brightness and all coefficients according to a variety of maximum brightnesses should be delivered, this field may be used to provide information on the coefficients. In this case, a method for designating a field indicating the number of conditions and designating EOTF_target_max_brightness and EOTF_coefficients 1 to N with respect to each condition may be used.

Data bytes 18+1 to 18+N may include EOTF_Coefficients 1 to N fields, respectively. The EOTF_Coefficients 1 to N fields may indicate a parameter value used if the E0 field is 1. In addition, this field may be used to transmit an arbitrary EOTF function.

Assume that the above-described information is transmitted from the source device to the sink device over an interface. However, this information may be transmitted via video (e.g., SEI message) or a separate metadata delivery method of a storage device. Accordingly, the same information may be defined in a video source or the source device may receive additional metadata of content via an external server.

According to one embodiment of the present invention, the InfoFrame shown in this figure may be referred to as a dynamic range and mastering InfoFrame.

FIG. 12 is a diagram showing a detailed example of post processing type information disclosed according to an embodiment of the present invention. As shown, the source device may deliver display related information and color gamut information to the sink device via the InfoFrame if the source device performs post processing of UHD video to suit the sink device.

The P3 to P0 fields of InfoFrame Data byte 1 indicate the post_processing_type and options related to HDR information or WCG information and the post processing type is shown in this figure.

For example, if the post_processing_type is 0000, this indicates that the source device does not perform any processing and, if the post_processing_type is 0001, this indicates that the source device performs dynamic range mapping.

For example, if the post_processing_type is 0010, this indicates that the source performs color gamut mapping and, if the post_processing_type is 0011, this indicates that the source device suitably performs processing based on the information delivered by the sink device. This value may be used as an initial value.

The values 0110 to 1000 of the post_processing_type may be used for information exchange between the sink and source devices in the future, for the multilayer video enhancement function, and the values 1001 to 1110 may be used for user private.

For example, if the post_processing_type is 1111, this indicates that the original color gamut information Orig_color_gamut is used to distinguishably signal the contents color gamut and the container color gamut. That is, in one embodiment of the present invention, if signaling of the color gamut different from the contents color gamut is necessary, the post_processing_type field may be used. Similarly, in another embodiment of the present invention, if signaling of the dynamic range different from the contents dynamic range is necessary, the post_processing_type field may be used. In this case, for example, 1110 may be allocated as the post_processing_type.

FIG. 13 is a diagram showing a detailed example of original color gamut information Orig_color_gamut according to an embodiment of the present invention.

As shown, if the source device processes UHD video to suit the sink device, the original color gamut information Orig_color_gamut of the content may be transmitted to the sink device.

In this example, if the field of the color gamut information Orig_color_gamut of the original content is 0000, the color of the original content is defined according to REC.709 and, if the Orig_color_gamut field of the content is 0001, the color of the original content is defined according to BT. 2020 NCL. Similarly, if this field is 0010, 0011, 0110 or 0101, this indicates that the colors of the original content are defined according to xvYCC, DCI-P3, Adobe RGB or BT. 2020 CL, respectively.

FIG. 14 is a diagram showing another example of delivering video color information from the source device to the sink device according to an embodiment of the present invention.

In the embodiment of the present invention, the format of AVI InfoFrame version 3 may be extended to deliver the post processing type information post_processing_type_flag, color transformation function information new_EOTF_flag and brightness information black_luminance_level or white_luminance_level of video processed by the source device to the sink device. In the embodiment of the present invention, the post processing type information post_processing_type_flag, color transformation function information new_EOTF_flag and brightness information black_luminance_level or white_luminance_level of video processed by the source device may be delivered to the sink device using a newly defined AVI InfoFrame over the interface of the source/sink device.

According to the disclosed AVI InfoFrame, the source device may deliver information on processed video to the sink device according to data byte. In this example, data bytes 14 to 29 may include data bytes 1 to 16 shown in FIGS. 11 to 13.

Accordingly, according to the present embodiment, the source information may deliver information on post processing, brightness information of content after post processing, brightness information of content before post processing and color gamut information to the sink device.

In the embodiment of the present invention, the format of AVI InfoFrame version 3 may be extended to deliver Orig_color_gamut, RGBW index, EOTF_type, private_EOTF_coeff_flag, Number of Coefficients, EOTF_additional_info and/or EOTF_Coefficient to the sink device and to deliver the above-described information using a newly defined AVI InfoFrame over the interface of the source/sink device.

In this figure, data bytes 30 to data byte 31+N may include data byte 17 to data byte 18+N shown in FIGS. 11 to 13.

Figure 15:
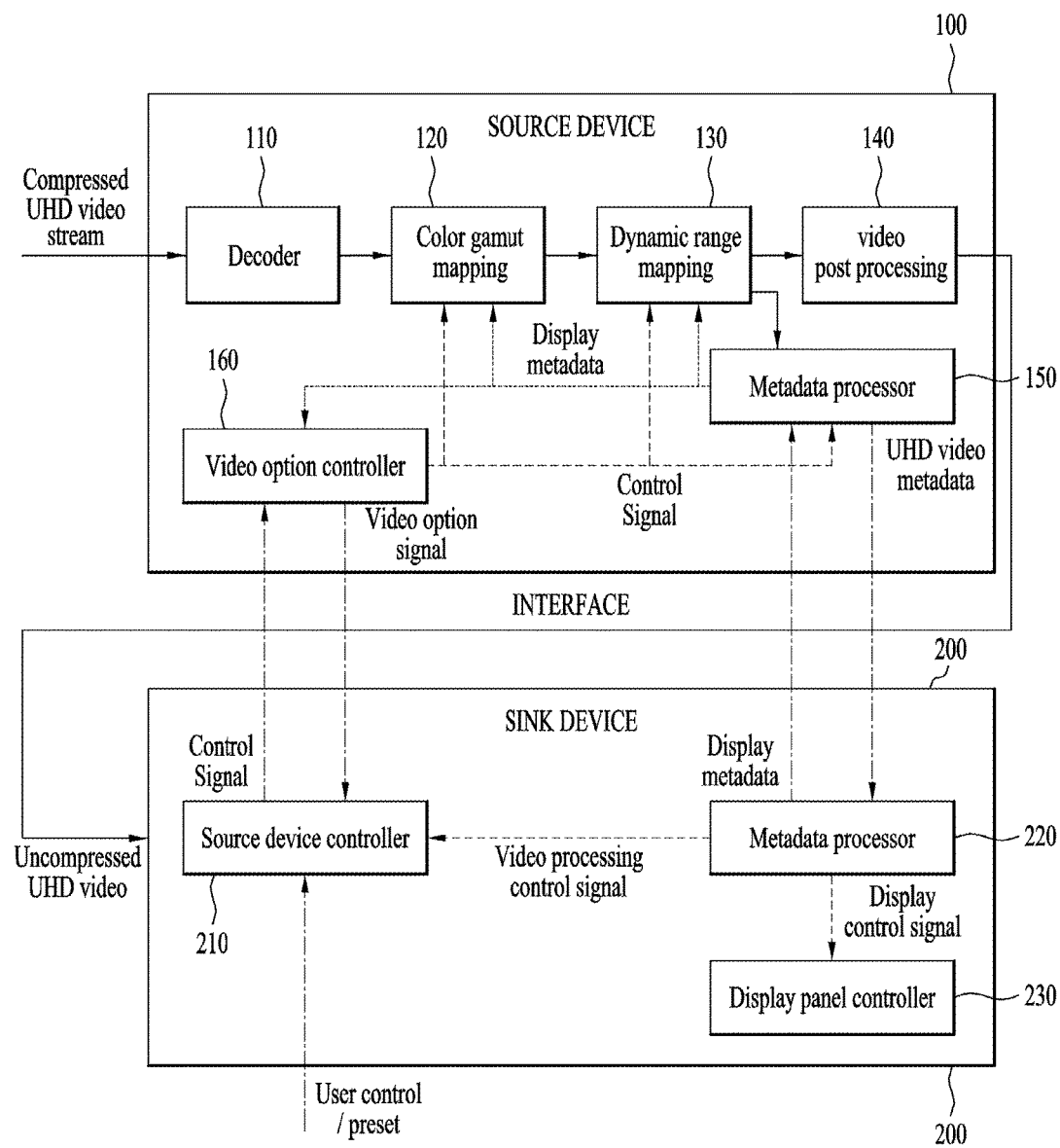
FIG. 15 is a diagram showing an example of a signal processing device according to one embodiment of the present invention and operations thereof.

FIG. 15 is a diagram showing an example of a signal processing device according to one embodiment of the present invention and operations thereof.

First, the example of the signal processing device according to one embodiment of the present invention includes a source device 100 and a sink device 200.

The source device 100 includes a decoder 110, a color gamut mapping unit 120, a dynamic range mapping unit 130, a post processing unit 140, a metadata processor 150 and an option controller 160.

The color gamut mapping unit 120, the dynamic range mapping unit 130 and the post processing unit 140 of the source device 100 may be referred to as a video processing unit and the color gamut mapping unit 120, the dynamic range mapping unit 130 and the post processing unit 140 of the video processing unit may individually operate upon video processing, if necessary, regardless of a previous block.

The sink device 200 includes a source device controller 210, a metadata processor 220 and a panel controller 230. If the source device 100 is connected to the sink device 200 via an interface, information may be transmitted and received according to the protocol shown in FIG. 3. Transmission and reception of information between the devices are performed via the interface.

The source device 100 may decode an encoded UHD video stream, perform post processing of decoded UHD video, if necessary, or process UHD video according to display capabilities of the sink device 200, and provide the processed UHD video to the sink device.

The sink device 200 may receive and display the UHD video decoded by the source device 100. The sink device may provide information on display capabilities of the sink device 200 to the source device 100 and receive and display the UHD video displayable by the sink device 200 from the source device 100.

The option controller 160 of the source device 100 may transmit a video option signal via the interface with the sink device 200 to request the display related information. The display related information may include color gamut information and display brightness related information. The video option information transmitted from the source device 100 to the sink device 200 is shown in FIGS. 11 to 14.

The metadata processor 150 of the source device 100 may transmit metadata of UHD video to the sink device 100 and the sink device 220 may transmit metadata related to the display device to the source device 100.

The decoder of the source device 100 may receive and decode the encoded UHD video stream.

The color gamut mapping unit 120 maps color gamut information of the decoded UHD video. In this case, the color gamut information of the UHD video may be mapped and changed using the display related information of the sink device 200 or the metadata of the UHD video.

Alternatively, the dynamic range mapping unit 130 may map the dynamic range of the decoded UHD video. In this case, the dynamic range of the UHD video may be mapped and changed using the display related information of the sink device 200 or the metadata of the UHD video.

The post processing unit 140 may perform video post processing with respect to the decoded UHD video. Video post processing may be performed based on the display related information.

The metadata processor 150 may transmit the metadata of the UHD video to the sink device 200 and receive the metadata related to the display from the sink device.

The option controller 160 may transmit the video option information to the sink device 200 and receive display option information from the sink device 200. Examples of the display option information transmitted from the sink device 100 to the source device 200 are shown in FIGS. 4 to 10. The video option information transmitted from the source device 100 to the sink device 200 is shown in FIGS. 11 to 14.

The source device controller 210 of the sink device 200 may transmit a control signal for controlling the source device 100 and receive a user control signal from a user.

The metadata controller 220 of the sink device 200 may receive the metadata of the UHD video from the source device 100 and transmit the metadata related to the display device to the source device 100. The metadata processor 220 may transmit a video processing control signal to the source device controller 210 to enable the source device controller 210 to transmit the control signal.

The panel controller 230 may control the display panel according to the display control signal of the metadata processor 220.

In the embodiment of the present invention, it is possible to perform video processing adapted to the display. That is, in the embodiments of the present invention, information exchange between the source and sink devices, video processing and display methods may be changed according to capabilities of the sink device 200. Hereinafter, an example of transmitting the metadata information of the sink device 200 to the source device 100, performing video processing based on the display related information at the source device and receiving the display related information and outputting video by the sink device 200 will be described in detail.

First, a first embodiment in which the sink device 200 is a high-end UHD sink device will be described.

If the sink device 200 is a high-end UHD sink device, the sink device 200 may transmit display related metadata to the source device 100. The display related information may include display color gamut information (or color primary information corresponding to RGBW) and display dynamic range related information (e.g., peak luminance information and black luminance information). The metadata processor 220 of the sink device 200 may process the display related information. For example, the metadata processor 220 of the sink device 200 may store the display related information, which will be referred to upon content processing and display, and request this information from the source device 100 as necessary.

The source device 100 may deliver the control signal of the source device 100 as well as the color and brightness related metadata of the display when delivering the display related information to the sink device 200.

The control signal of the source device 100 may include information indicating which video processing of the source device 100 is possible. The control signal of the source device 100 may be generated based on a displayable color gamut delivered by the source device controller 210 of the sink device 200 and may be generated according to a default processing request without information received from the sink device 200.

Although an information exchange process between the source and sink devices is performed when the two devices are connected, information exchange between the two devices may be performed again when broadcast or streaming content is received in a state wherein the source and sink devices are connected, when content is changed or when a specific scene is changed.

Video processing when the sink device 200 is a high-end UHD sink device may be performed as follows.

The post processing unit 140 of the source device 100 may determine whether post processing should be performed with respect to the decoded UHD video based on the display related information of the sink device 200 from the metadata processor 150 and output a control signal thereof. The source device 100 may perform video processing related to WCG information or HDR information of the UHD video, e.g., color gamut mapping or dynamic range mapping. If display capabilities of the sink device 200 are sufficient to play the UHD video back after video post processing, the option controller 160 of the source device 100 may deliver the information to the post processing unit 140. If the WCG information or HDR information of the video is changed based on the display color gamut information or brightness information of the sink device 200, the metadata processor 150 may transmit the display related metadata to the color gamut mapping unit 120 or the dynamic range mapping unit 130.

The post processing unit 140 of the source device 100 may perform post processing using metadata transmitted along with video, for example, a WCG SEI message or an HDR SEI message. The video decoder 110 or the post processing unit 140 may decode enhancement layer data to increase image quality of output video, if enhancement layer data is transmitted according to scalable coding.

Although the image quality of output video may be further improved to suit the image quality of the display, if additional information for video processing is not received from the sink device 200, the source device 100 may autonomously perform an image quality improvement function.

The metadata processor 150 delivers UHD video metadata including the WCG information or HDR information of the decoded or post-processed video to the sink device 200. In addition, the option controller 160 may contain the processed video processing information in the video option information (video option signal) and transmit the video option information to the source device controller 210. The video option information is shown in FIGS. 11 to 14.

If the video decoded by the decoder 110 is suitable for the display, the video may be delivered to the sink device 200 for playback, without separate processing of the WCG information or HDR information of video. In this case, the option controller 160 may signal information indicating that separate video processing is not performed.

The sink device 200 may display the UHD video via the display device. In this case, although the sink device 200 may play the processed video back via the source device 100 without transformation, it may be determined whether the video delivered by the source device 100 has been processed to suit the display. The source device controller 210 of the sink device 200 may output the control signal to the source device 100. The source device controller 210 of the sink device 200 may determine a portion in which a problem occurs during video processing of the source device 100 and output the control signal to stop video processing, if the video is not suitably processed. This control function may be turned on/off according to a user request. The sink device 200 may output a video processing option to the user and provide a menu or interface UI for controlling the same to the user.

The sink device 200 may analyze information on the metadata processor 220 of the sink device 200 and then control the display device via the panel controller 230 to provide a playback environment suitable for content, if brightness and color of the display device can be controlled.

Next, a second embodiment wherein the sink device 200 is a legacy UHD sink device will be described. For the same portions as the first embodiment, refer to the first embodiment.

The sink device 200 transmits metadata of the legacy UHD sink device to the source device 100. The metadata of the legacy UHD sink device may include color gamut information (or color primary information corresponding to RGBW) and display dynamic range related information (e.g., peak luminance information and black luminance information) of the display. The metadata processor 150 of the source device 100 may receive and process the metadata of the legacy UHD sink device.

The option controller 160 of the source device 100 determines whether post processing is performed with respect to the decoded UHD video based on the display related information acquired by the metadata processor 150 and outputs a control signal.

If capabilities of the display are insufficient for image quality (color and brightness) of video to be displayed, appropriate processing may be performed with respect to the video to achieve color and brightness expressible by the display. For example, the color gamut mapping unit 120 or the dynamic range mapping unit 130 of the source device 100 may map the color gamut information or dynamic range information of the UHD video to information suitable for the display device.

The source device 100 may change WCG information or HDR information of video data based on the metadata of the video data, e.g., the WCG SEI message, the HDR SEI message, etc. or according to the function of the source device 100. If the WCG information or HDR information of the video data is changed, the option controller 160 may contain the WCG information or the HDR information in the video option information (video option signal) and transmit the video option information to the sink device 200. The video option information is shown in FIGS. 11 to 14.

If the color and brightness range of the display of the sink device 200 can support the color and dynamic range of video, the source device 100 may transmit the video to the sink device 200 without additional video processing. The option controller 160 of the source device 100 may deliver information indicating that the metadata, WCG information or HDR information of the UHD video is not processed to the sink device 200 via the video option signal.

The display device of the sink device 200 may play the UHD video back. If it is determined that the WCG information or HDR information of the UHD video received by the sink device 200 is not suitable for the display device of the sink device 200, the source device controller 210 may deliver a control signal to the source device 100. The user can control the functions related to the display device via a user menu or an interface UI.

FIG. 16 is a diagram showing the configuration of an EOTF type according to one embodiment of the present invention.

According to one embodiment of the present invention, EOTF type "000" indicates a reserved bit, EOTF type "001" indicates that an EOTF_type1 transformation curve is used, EOTF type "010" indicates that an EOTF_type2 transformation curve is used, and EOTF types "011" to "111" indicate user private.

Figure 17:
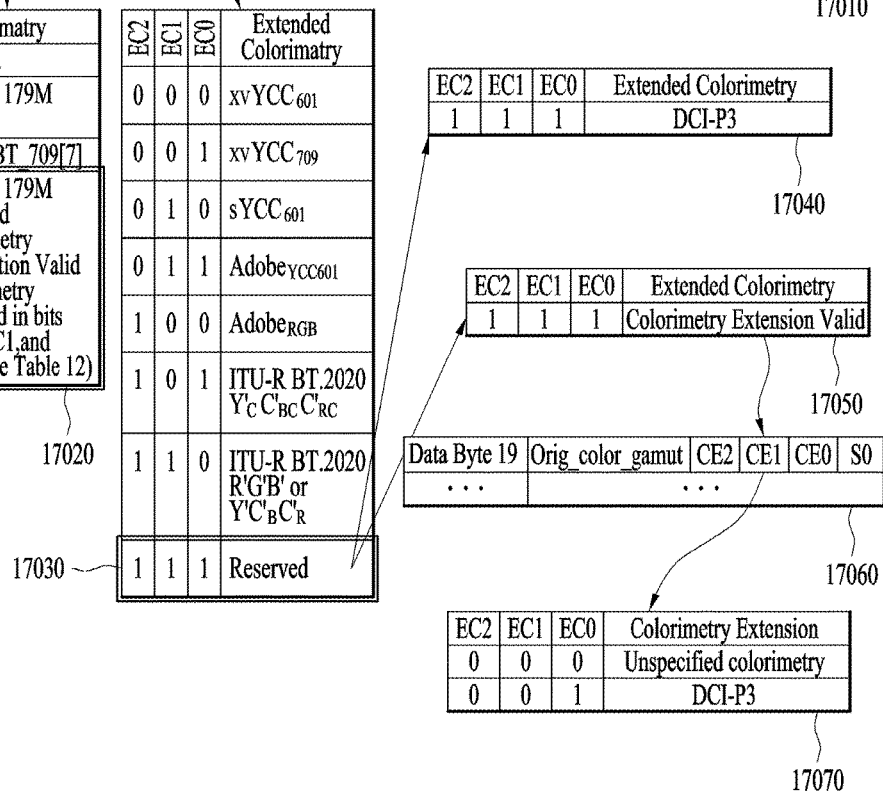
FIG. 17 is a diagram showing a method of signaling a DCI-P3 color gamut according to one embodiment of the present invention.

FIG. 17 is a diagram showing a method of signaling a DCI-P3 color gamut according to one embodiment of the present invention.

In the present invention, the following embodiments will be described in order to define a new color gamut such as DCI-P3.

In one embodiment of the present invention, using C1 and C0 fields included in data byte 2 of an existing AVI InfoFrame 17010, use of EC2 to EC0 fields included in data byte 3 for extension of the color gamut may be signaled (17020). Using reserved bits of EC2 to EC0 fields, DCI-P3 may be signaled. That is, when EC2 to EC0 are 111, use of DCI-P3 is indicated (17030, 17040).

In another embodiment of the present invention, colorimetry extension may be signaled using reserved bits of EC2 to EC0 fields included in data byte 3 of the existing AVI InfoFrame 17010. That is, when EC2 to EC0 are 111, this may indicate colorimetry extension (17030, 17050). Using S3 to S0 fields which are reserved bits included in data byte 6 of the above-described dynamic range and mastering InfoFrame or data byte 19 of the above-described AVI InfoFrame, use of DCI-PC may be signaled (17060, 17070). At this time, less than or more than 3 bits may be used as necessary. Further, using S3 to S0 fields, which are the reserved bits, use of an arbitrary color gamut may be signaled (17070).

FIG. 18 is a diagram showing a method of signaling a DCI-P3 color gamut according to another embodiment of the present invention.

In one embodiment of the present invention, using C1 and C0 fields included in data byte 2 of an existing AVI InfoFrame 18010, use of EC2 to EC0 fields included in data byte 3 for extension of the color gamut may be signaled (18020). In addition, colorimetry extension may be signaled using reserved bits of EC2 to EC0 fields included in data byte 3 of the existing AVI InfoFrame 18010. That is, when EC2 to EC0 are 111, this may indicate colorimetry extension (18030, 18050). Using reserved bits of the dynamic range and mastering InfoFrame according to one embodiment of the present invention, use of DCI-P3 may be signaled. For example, as shown in the figure, reserved bits included in data byte 1 may be used (18060). Further, use of an arbitrary color gamut may be signaled using the above-described reserved bits (18050).

FIG. 19 is a diagram showing a method of signaling a DCI-P3 color gamut according to another embodiment of the present invention.

In one embodiment of the present invention, a new InfoFrame may be defined in order to signal a new color gamut such as DCI-P3. For example, an InfoFrame having an information type of 0x08 may be newly defined and bits for the new color gamut may be allocated to signal use of the new color gamut.

In another embodiment of the present invention, as a method of extending an existing AVI InfoFrame format, as shown in this figure, data byte 14 may be newly defined. At this time, using C1 and C0 fields included in data byte 2 of the existing AVI InfoFrame, use of EC2 to EC0 fields included in data type 3 for extension of the color gamut may be signaled. In addition, using reserved bits of EC2 to EC0 fields included in data byte 3 of the existing AVI InfoFrame, colorimetry extension may be signaled. That is, when EC2 to EC0 are 111, this may indicate colorimetry extension. Here, in one embodiment of the present invention, in consideration of backward compatibility, if EC2 to EC0 fields of data byte 3 are 111 while the same version number as the existing AVI InfoFrame is used, colorimetry extension may be recognized and data byte 14 may be read. In contrast, even if backward compatibility is not considered, as shown in this figure, in another embodiment of the present invention, information indicating that a new version number is assigned to the AVI InfoFrame, the length of the AVI InfoFrame is set to 14 and the InfoFrame of up to data byte 14 is defined may be signaled, colorimetry extension is recognized if EC2 to EC0 fields of data byte 3 are 111, and colorimetry may be signaled.

FIG. 20 is a diagram showing information on a transfer function which may be processed by the sink device according to one embodiment of the present invention.

This figure shows an example of information delivered from the source device to the sink device using a data block of a DisplayID. The case in which the offset field is 0x00 to 0x05 was described above.

In one embodiment of the present invention, as shown in this figure, the offset field may be assigned to further deliver transfer function related information of the sink device. At this time, in one embodiment of the present invention, a predefined transfer function (BT. 1886, SMPTE ST 2084, etc.) may be signaled and detailed information of an unspecified transfer function may be signaled.

As shown in this figure, if the offset field is 0x06, this may indicate a transfer function type flag. The transfer function type flag may signal a transfer function type. In one embodiment of the present invention, since each transfer function is designated as a flag, all supported transfer functions are simultaneously signaled even when a plurality of transfer functions is supported. Here, the transfer function may include BT. 1886, SMPTE ST 2084, Traditional gamma—SDR Luminance Range, Traditional gamma—HDR Luminance Range, etc. Here, the transfer function may include an electro optical transfer function (EOTF).

If the offset field is 0x07 to 0x0A, this may indicate unspecified TF details. In one embodiment of the present invention, if an unspecified transfer function is supported, this may be expressed via separate signaling. For example, if an unspecified transfer function is supported, transfer function type flag=0x80 (hexadecimal) or 10000000 (binary) may be indicated. In one embodiment of the present invention, in consideration of various unspecified transfer functions, the type of each transfer function may be signaled and additional information such as the number of necessary coefficients, bit depth or maximum/minimum brightness information may be delivered according to each type. At this time, the transfer function type may indicate any one of various types of transfer functions. If a plurality of transfer functions is delivered, a bit indicating that the plurality of transfer functions is used (e.g., a number_of_types field) is separately assigned and the order of the plurality of transfer functions may be indicated using this field. A detailed description of information included in the unspecified TF details will be described below.

If the offset field is 0x0B or more, this may indicate unspecified TF coefficients. In one embodiment of the present invention, coefficient information of an unspecified transfer function may be delivered using this field. The above-described coefficient information may include information on an intersection of the transfer function, a section and a used function.

According to one embodiment of the present invention, information delivered from the sink device to the source device may be referred to as extended display identification data (EDID). Here, the EDID may indicate capabilities of the sink device.

Further, the EDID includes an HDR static metadata data block indicating HDR capabilities of the sink device and the HDR static metadata may include information on the above-described transfer function type.

The EDID according to one embodiment of the present invention may include one or more data blocks.

The HDR static metadata according to one embodiment of the present invention may be included in a data block and transmitted. Further, the HDR static metadata may include information indicating whether the data block includes the HDR static metadata and/or information indicating the length of the data block.

FIG. 21 is a diagram showing detailed field values used in a method of delivering information on a transfer function which may be processed by the sink device according to one embodiment of the present invention.

According to one embodiment of the present invention, an offset field value "0x06" is used to indicate the transfer function type, offset field values "0x07" to "0x0A" are used to indicate unspecified TF details, and offset field values 0x0B to or more are used to indicate unspecified TF coefficients. Here, the unspecified TF details indicate additional information of an unspecified transfer function if the sink device supports the unspecified transfer function and may include the type of an unspecified transfer function, the number of coefficients in the unspecified transfer function, the number of types of each transfer function if a plurality of transfer functions configures the unspecified transfer function, bit depth, the lowest brightness level of the sink device and/or the highest brightness level of the sink device.

If the offset field is 0x06, a higher 1 bit of the value may indicate that the unspecified transfer function may be processed, a next 1 bit thereof may indicate that the EOTF according to BT. 1886 may be processed and a next 1 bit thereof may indicate that the EOTF according to SMPTE ST 2084 may be processed.

If the offset field is 0x07, higher 4 bits of the value may be used to indicate the type of the unspecified transfer function and the lower 4 bits may be used to indicate the number of coefficients in the unspecified transfer function.

If the offset field is 0x08, higher 2 bits of the value may be used to the number of types and next 2 bits thereof may be used to indicate the bit depth.

If the offset field is 0x09, the value may indicate the lowest brightness level of the sink device.

If the offset field is 0x0A, the value indicates the lowest brightness level of the sink device using an LSB and indicates the highest brightness level of the sink device using the remaining 7 bits.

If the offset field is 0x0B or more, the value may indicate coefficient information used in the unspecified transfer function.

Figure 22:
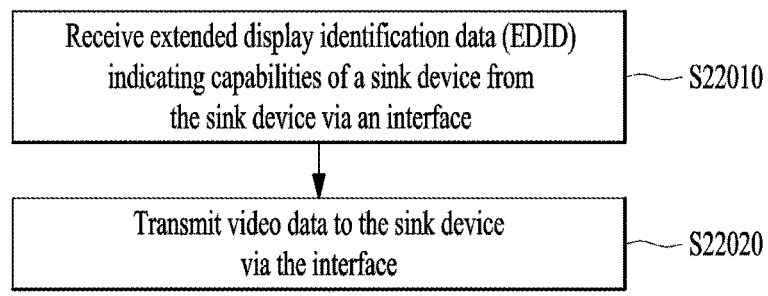
FIG. 22 is a diagram showing a video data processing method according to one embodiment of the present invention.

FIG. 22 is a diagram showing a video data processing method according to one embodiment of the present invention.

The video data processing method according to one embodiment of the present invention may include step S22010 of receiving extended display identification data (EDID) indicating capabilities of a sink device from the sink device via an interface and step S22020 of transmitting video data to the sink device via the interface. Here, EDID may include electro optical transfer function (EOTE) type information for identifying an EOTF supported by the sink device. The EDID was described above with reference to FIGS. 20 and 21. In addition, the overall processing procedure was described above with reference to FIG. 15.

According to another embodiment of the present invention, the EDID may include high dynamic range (HDR) static metadata indicating HDR capabilities of the sink device. Further, the HDR static metadata may include EOTF type information. This was described above with reference to FIGS. 20 and 21.

According to another embodiment of the present invention, the HDR static metadata may be included and transmitted in a data block. The HDR static metadata may include information for identifying that the data block includes HDR static metadata and/or information indicating the length of the data block. This was described above with reference to FIG. 20.

According to another embodiment of the present invention, the above-described video data processing method may further include step of receiving video characteristics information indicating the characteristics of the video data from the source device via the interface. Here, the video characteristics information may include information indicating that there is an extension of colorimetry and/or information indicating extended colorimetry. This was described above with reference to FIGS. 17, 18 and 19.

Figure 23:
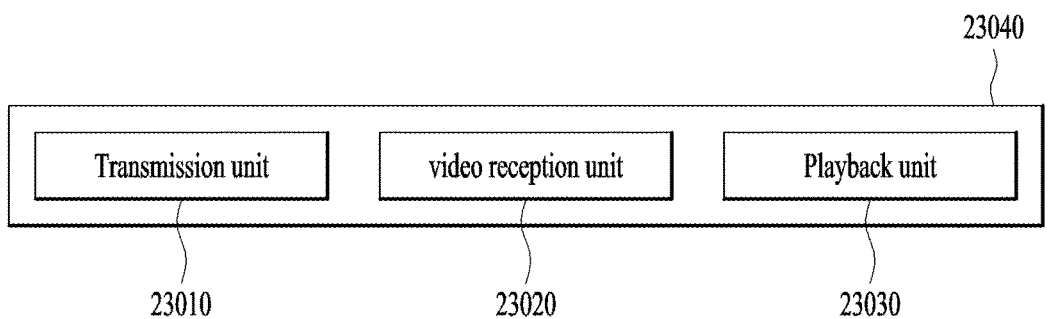
FIG. 23 is a diagram showing the configuration of a video data processing device according to one embodiment of the present invention.

FIG. 23 is a diagram showing the configuration of a video data processing device according to one embodiment of the present invention.

The video data processing device 23040 according to one embodiment of the present invention may include a transmission unit 23010, a video reception unit 23020 and/or a playback unit 23030.

The transmission unit may transmit EDID information indicating capabilities of a sink device to a source device via the interface. Here, EDID may include electro optical transfer function (EOTE) type information for identifying an EOTF supported by the sink device.

The video reception unit may receive video data from the source device via the interface.

The playback unit may play the received video data back.

The configuration of the video data processing device 23040 according to one embodiment of the present invention may perform the steps of the video data processing method (FIG. 1). Each configuration may correspond to hardware or may be combined with hardware.

Figure 24:
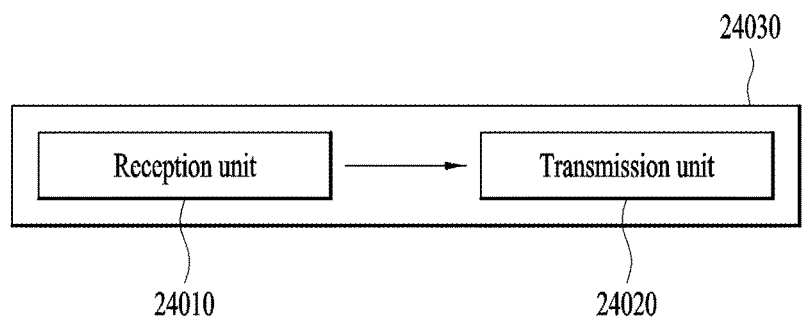
FIG. 24 is a diagram showing the configuration of a video data processing device according to one embodiment of the present invention.

FIG. 24 is a diagram showing the configuration of a video data processing device according to one embodiment of the present invention.

The video data processing device 24030 according to one embodiment of the present invention may include a reception unit 24010 and/or a video transmission unit 24020.

The reception unit may receive EDID indicating capabilities of a sink device from the sink device via the interface. Here, EDID may include electro optical transfer function (EOTE) type information for identifying an EOTF supported by the sink device.

The video transmission unit may transmit video data to the sink device via the interface.

The configuration of the video data processing device 24030 according to one embodiment of the present invention may perform the steps of the video data processing method (FIG. 22). Each configuration may correspond to hardware or may be combined with hardware.

According to the embodiments of the present invention, it is possible to optimally view content including UHD content under various display device conditions.

According to the embodiments of the present invention, it is possible to reduce color or brightness restrictions according to the physical properties of display devices when content including UHD content is displayed on various display devices.

According to the embodiments of the present invention, it is possible to optimally view content including UHD content by delivering the properties of a display device even when content including the UHD content is supplied via an external device.

The modules, units or blocks according to the embodiments of the present invention may be processors/hardware for executing a series of processes stored in a memory (or a storage unit). The steps or methods described in the above-described embodiments may be performed by hardware/processors. The methods proposed by the present invention may be executed as code. The code may be written in a process-readable storage medium and thus may be read by a processor provided by an apparatus according to the embodiments of the present invention.

Although the description of the present invention is explained with reference to each of the accompanying drawings for clarity, it is possible to design new embodiment(s) by merging the embodiments shown in the accompanying drawings with each other. In addition, if a recording medium readable by a computer, in which programs for executing the embodiments mentioned in the foregoing description are recorded, is designed in necessity of those skilled in the art, it may be within the scope of the appended claims and their equivalents.

An apparatus and method according to the present invention are not limited by the configurations and methods of the embodiments mentioned in the foregoing description. In addition, the embodiments mentioned in the foregoing description can be configured in a manner of being selectively combined with one another entirely or in part to enable various modifications.

In addition, the video processing method according to the present invention can be implemented with processor-readable codes in a processor-readable recording medium provided to a network device. The processor-readable medium may include all kinds of recording devices capable of storing data readable by a processor. The processor-readable medium may include one of ROM, RAM, CD-ROM, magnetic tapes, floppy disks, optical data storage devices, and the like and also include a carrier-wave type implementation such as transmission over the Internet. Furthermore, as the processor-readable recording medium is distributed to a computer system connected via network, processor-readable codes can be saved and executed in a distributed manner.

Although the preferred embodiments of the present invention have been disclosed for illustrative purposes, those skilled in the art will appreciate that various modifications, additions and substitutions are possible, without departing from e scope and spirit of the invention as disclosed in the accompanying claims. Such modifications should not be individually understood from the technical spin or prospect of the present invention, Both apparatus and method inventions are mentioned in this specification and descriptions of both of the apparatus and method inventions may be complementarily applicable to each other.

Various embodiments have been described in the best mode for carrying out the invention.

The present invention is applicable to a series of broadcast service provision fields.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A video data processing method comprising:
transmitting extended display identification data, EDID, indicating capabilities of a sink device to a source device via an interface, the EDID including first electro optical transfer function, EOTF, type information for identifying EOTF supported by the sink device;
receiving video data of a content from the source device via the interface;
receiving InfoFrame carrying metadata associated with dynamic range and mastering information of the video data from the source device,
wherein the InfoFrame includes type code information identifying the InfoFrame, second EOTF type information for identifying EOTF used in the video data, maximum content luminance information indicating maximum luminance of the content, minimum content luminance information indicating minimum luminance of the content, maximum mastering display luminance information indicating maximum luminance of a mastering display configured for a mastering process of the content and minimum mastering display luminance information indicating minimum luminance of the mastering display; and
playing the received video data back.

2. The video data processing method according to claim 1, wherein the EDID includes high dynamic range, HDR, static metadata indicating HDR capabilities of the sink device and the HDR static metadata includes the first EOTF type information.

3. The video data processing method according to claim 2, wherein the HDR static metadata is included and transmitted in a data block and the HDR static metadata includes information for identifying that the data block includes the HDR static metadata and information indicating the length of the data block.

4. The video data processing method according to claim 1, further comprising receiving video characteristics information indicating characteristics of the video data from the source device via the interface,
wherein the video characteristics information includes at least one of information indicating that there is an extension of colorimetry and information indicating the extended colorimetry.

5. A video data processing device comprising:
a transmission processor that transmits extended display identification data, EDID, indicating capabilities of a sink device to a source device via an interface, the EDID including first electro optical transfer function, EOTF, type information for identifying EOTF supported by the sink device;
a video reception processor that receives video data of a content from the source device via the interface;
a signaling reception processor that receives InfoFrame carrying metadata associated with dynamic range and mastering information of the video data from the source device,
wherein the InfoFrame includes type code information identifying the InfoFrame, second EOTF type information for identifying EOTF used in the video data, maximum content luminance information indicating maximum luminance of the content, minimum content luminance information indicating minimum luminance of the content, maximum mastering display luminance information indicating maximum luminance of a mastering display configured for a mastering process of the content and minimum mastering display luminance information indicating minimum luminance of the mastering display; and a playback processor that plays the received video data back.

6. The video data processing device according to claim 5, wherein the EDID includes high dynamic range, HDR, static metadata indicating HDR capabilities of the sink device and the HDR static metadata includes the first EOTF type information.

7. The video data processing device according to claim 6, wherein the HDR static metadata is included and transmitted in a data block and the HDR static metadata includes information for identifying that the data block includes the HDR static metadata and information indicating the length of the data block.

8. The video data processing device according to claim 5, the signaling reception processor receives video characteristics information indicating characteristics of the video data from the source device via the interface, wherein the video characteristics information includes at least one of information indicating that there is an extension of colorimetry and information indicating the extended colorimetry.

9. A video data processing method comprising:

receiving extended display identification data, EDID, indicating capabilities of a sink device from the sink device via an interface, the EDID including first electro optical transfer function, EOTF, type information for identifying EOTF supported by the sink device; and transmitting video data of a content and InfoFrame carrying metadata associated with dynamic range and mastering information of the video data to the sink device via the interface, wherein the InfoFrame includes type code information identifying the InfoFrame, second EOTF type information for identifying EOTF used in the video data, maximum content luminance information indicating maximum luminance of the content, minimum content luminance information indicating minimum luminance of the content, maximum mastering display luminance information indicating maximum luminance of a mastering display configured for a mastering process of the content and minimum mastering display luminance information indicating minimum luminance of the mastering display.

10. The video data processing method according to claim 9, wherein the EDID includes high dynamic range, HDR, static metadata indicating HDR capabilities of the sink device and the HDR static metadata includes the first EOTF type information.

11. The video data processing method according to claim 10, wherein the HDR static metadata is included and transmitted in a data block and the HDR static metadata includes information for identifying that the data block includes the HDR static metadata and information indicating the length of the data block.

12. The video data processing method according to claim 9, further comprising transmitting video characteristics information indicating characteristics of the video data to the sink device via the interface, wherein the video characteristics information includes at least one of information indicating that there is an extension of colorimetry and information indicating the extended colorimetry.

13. A video data processing device comprising:

a reception processor that receives extended display identification data, EDID, indicating capabilities of a sink device from the sink device via an interface, the EDID including electro optical transfer function, EOTF, type information for identifying EOTF supported by the sink device; and a transmission processor that transmits video data of a content and InfoFrame carrying metadata associated with dynamic range and mastering information of the video data to the sink device via the interface, wherein the InfoFrame includes type code information identifying the InfoFrame, second EOTF type information for identifying EOTF used in the video data, maximum content luminance information indicating maximum luminance of the content, minimum content luminance information indicating minimum luminance of the content, maximum mastering display luminance information indicating maximum luminance of a mastering display configured for a mastering process of the content and minimum mastering display luminance information indicating minimum luminance of the mastering display.

14. The video data processing device according to claim 13, wherein the EDID includes high dynamic range, HDR, static metadata indicating HDR capabilities of the sink device and the HDR static metadata includes the first EOTF type information.

15. The video data processing device according to claim 14, wherein the HDR static metadata is included and transmitted in a data block and the HDR static metadata includes information for identifying that the data block includes the HDR static metadata and information indicating the length of the data block.

* * * * *